(12) United States Patent
Villet et al.

(10) Patent No.: US 6,965,374 B2
(45) Date of Patent: Nov. 15, 2005

(54) INFORMATION INPUT METHOD USING WEARABLE INFORMATION INPUT DEVICE

(75) Inventors: Jean-Yves Villet, Saint Romain en Jarez (FR); Sang-goog Lee, Anyang (KR); Kyung-ho Park, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 292 days.

(21) Appl. No.: 10/195,475

(22) Filed: Jul. 16, 2002

(65) Prior Publication Data

US 2003/0011573 A1    Jan. 16, 2003

(30) Foreign Application Priority Data

Jul. 16, 2001    (KR) ............................... 2001-42820

(51) Int. Cl.[7] ................................................ G09G 5/00
(52) U.S. Cl. ....................................... 345/169; 345/158
(58) Field of Search ................................ 345/156, 168, 345/169, 176, 158, 172, 175; 341/22, 20, 341/27, 33, 34; 400/472, 479, 407.1

(56) References Cited

U.S. PATENT DOCUMENTS

| | | | | |
|---|---|---|---|---|
| 5,736,976 A | * | 4/1998 | Cheung | 345/168 |
| 5,880,712 A | * | 3/1999 | Goldman | 345/168 |
| 6,380,923 B1 | * | 4/2002 | Fukumoto et al. | 345/156 |

FOREIGN PATENT DOCUMENTS

| | | |
|---|---|---|
| JP | 9-54646 A | 2/1997 |
| KR | 1998-067011 A | 10/1998 |

* cited by examiner

Primary Examiner—Vijay Shankar
Assistant Examiner—Nitin Patel
(74) Attorney, Agent, or Firm—Sughrue Mion, PLLC

(57) ABSTRACT

An information input method using a wearable information input device is provided. The information input method using a wearable information input device, which is worn on predetermined body parts of a user and has sensors for sensing motions of the predetermined body parts on a plane or in a space, includes selecting a key group including a desired key corresponding to information that the user desires to input by moving a first predetermined body part, and selecting the desired key from the selected key group by moving a second predetermined body part. Accordingly, the user can easily and quickly select a key on an information screen externally, and areas overlapped by the information screen in a monitor can be minimized.

28 Claims, 16 Drawing Sheets

FIG. 1
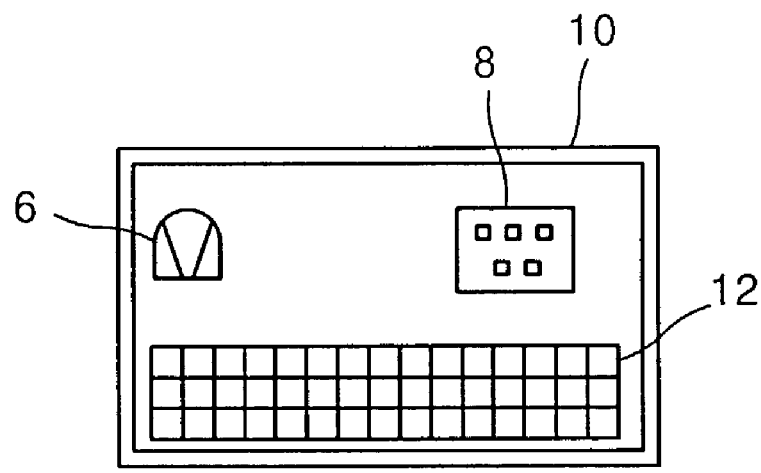
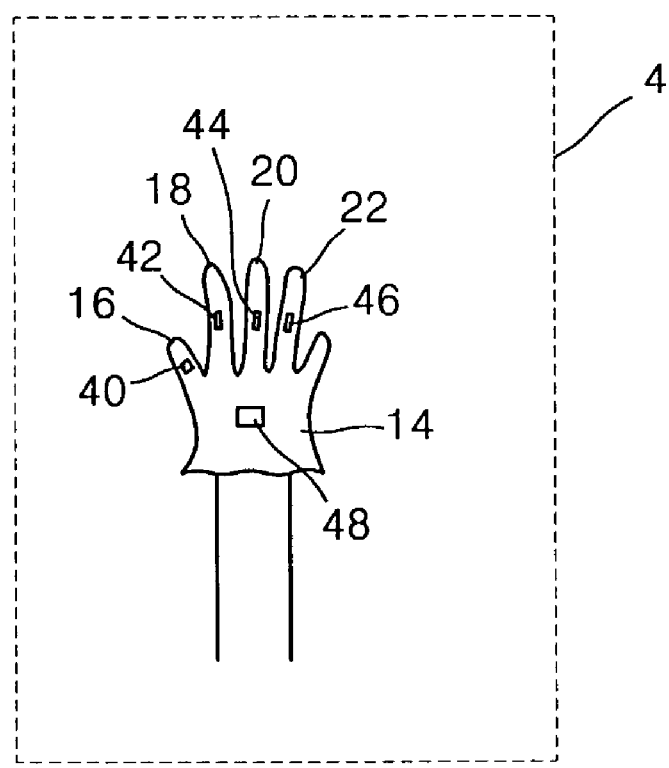

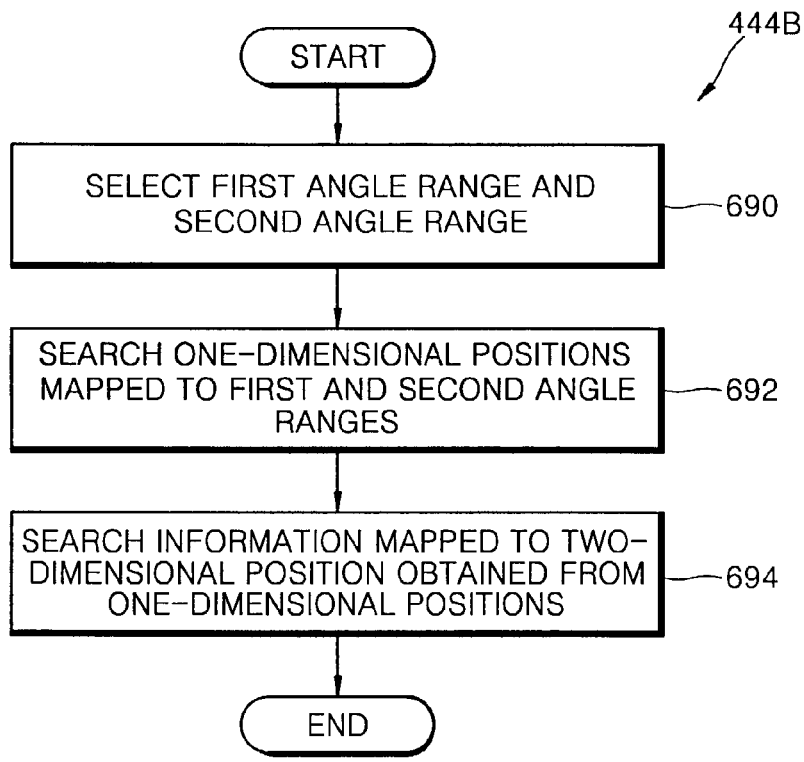
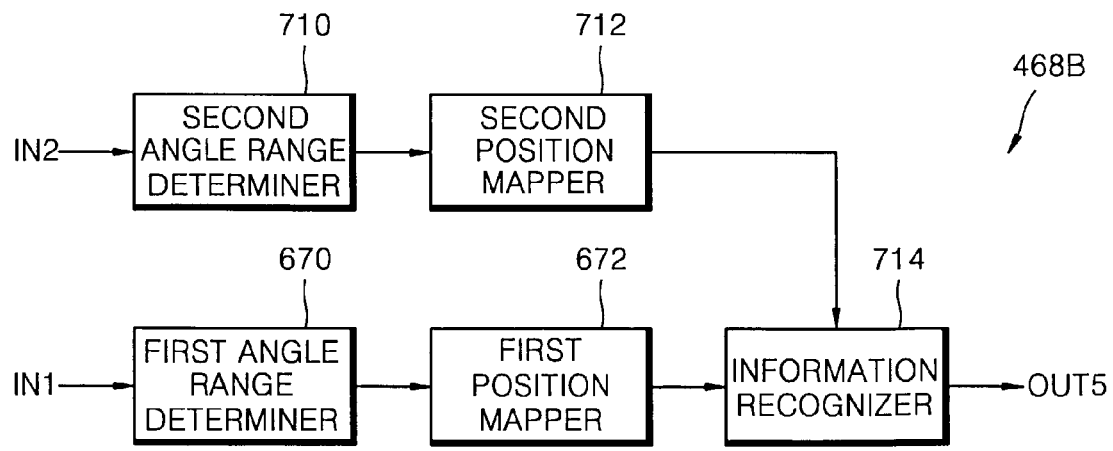

INFORMATION INPUT METHOD USING WEARABLE INFORMATION INPUT DEVICE

BACKGROUND OF THE INVENTION

1. Field of the Invention

The present invention relates to a system for externally inputting information using an information input device such as a keyboard, and more particularly, to an information input method of externally inputting information using a wearable information input device. The present application is based on Korean Patent Application No. 2001-42820, which is incorporated herein by reference.

2. Description of the Related Art

A familiar type of information input device is a QWERTY keyboard. However, recently, a virtual keyboard, which is virtually displayed and embodied in software, is used instead of a QWERTY keyboard for the convenience in portability and utilization. A virtual keyboard is disclosed in Korea Utility Model Application No. 1996-033413 published on 15 Jul. 1998 and entitled "Computer System with Virtual Keyboard". In Korea Utility Model Application No. 1996-033413, a mouse or a touch pad is used for selecting a key on a virtual keyboard pop-up displayed on a monitor.

When a user uses a mouse or touch pad for an extended period of time to select keys on a virtual keyboard, he/she becomes irritated and tired from inputting keys, and it takes too long to select a key. In addition, since the key pattern of a conventional virtual keyboard is the same as or similar to that of a presently used QWERTY keyboard, many unnecessary keys are displayed on a monitor, even when a user uses only character keys or numeral keys. As a result, the user cannot see a wide area of a screen containing images that are overlapped by the virtual keyboard.

SUMMARY OF THE INVENTION

To solve the above-described problems, it is an object of the present invention to provide an information input method of using a wearable information input device to easily and quickly select information displayed on an information screen in a predetermined pattern suitable for a user.

To achieve the above object of the invention, there is provided an information input method using a wearable information input device which is worn on predetermined body parts of a user's body and has sensors for sensing motions of the predetermined body parts on a plane or in a space. The information input method includes the steps of selecting a key group including a desired key corresponding to information that the user desires to input by moving a first predetermined body part; and selecting the desired key from the selected key group by moving a second predetermined body part. The information corresponding to the selected key is determined as input information.

BRIEF DESCRIPTION OF THE DRAWINGS

The above object and advantages of the present invention will become more apparent by describing in detail preferred embodiments thereof with reference to the attached drawings in which:

FIG. 1 is an exemplary diagram for explaining an information input method according to the present invention;

FIG. 20 is a flowchart of a second embodiment of step 444 shown in FIG. 10; and

FIG. 21 is a block diagram of a second embodiment of the information selection unit shown in FIG. 11 for performing step 444B shown in FIG. 20.

DETAILED DESCRIPTION OF THE INVENTION

Figure 2:
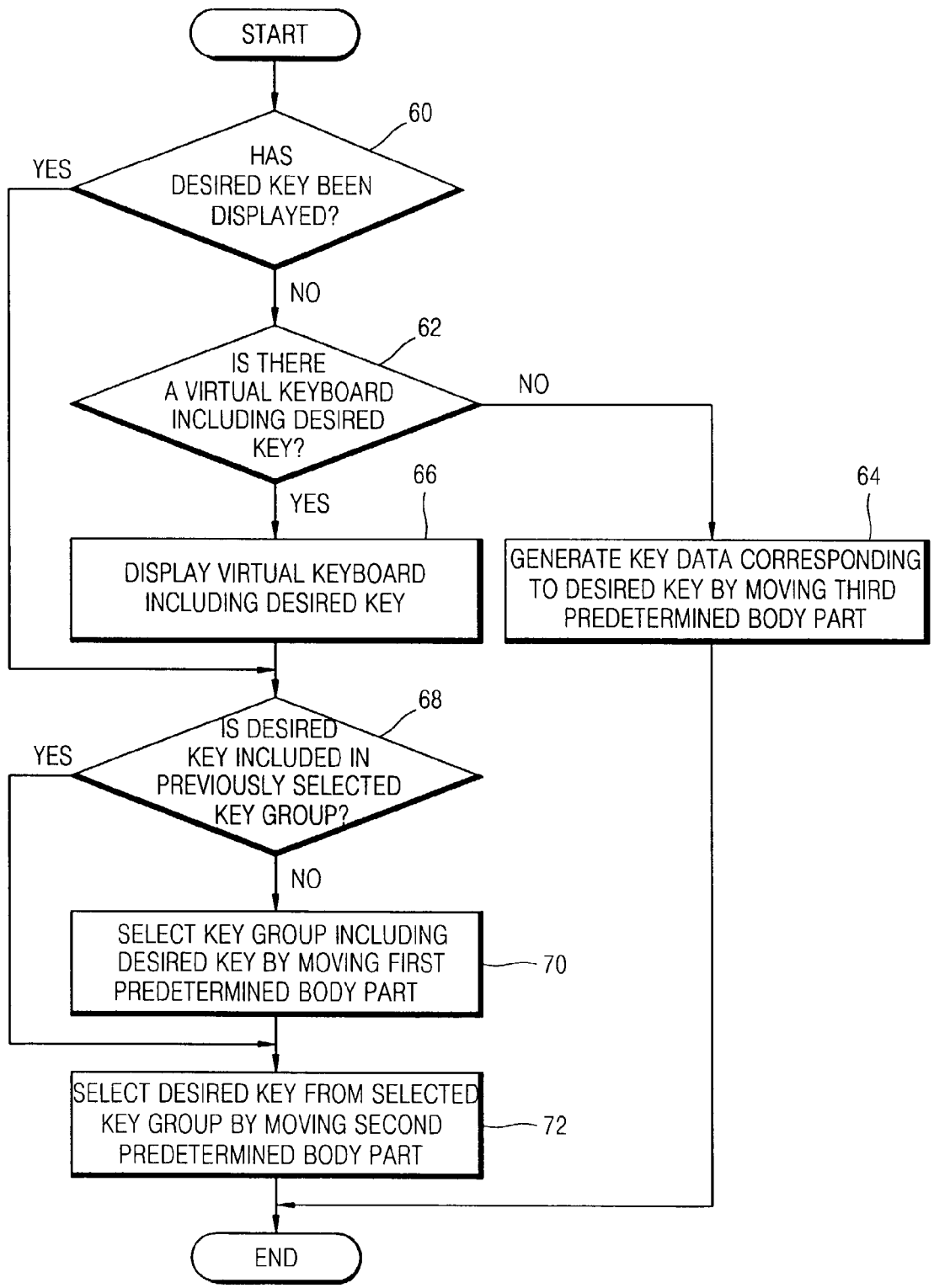
FIG. 2 is a flowchart of an embodiment of an information input method according to the present invention.

Hereinafter, an information screen and a wearable information input device which are used for performing an information input method according to the present invention, will be described with reference to the attached drawings.

FIG. 1 is an exemplary diagram for explaining an information input method according to the present invention. FIG. 1 shows a monitor 10 displaying an information screen 6, 8, or 12 and a sensing unit 4 of a wearable information input device.

In an information input method according to the present invention, a user selects a desired key among keys indicating key data information using the wearable information input device. Here, keys to be selected are shown via the information screen 6, 8, or 12, which is embodied as software and displayed on the monitor 10, so the user can select a desired key while viewing the information screen 6, 8, or 12. However, if the user becomes well acquainted with the positions and pattern of the keys displayed on the information screen 6, 8, or 12 as the user repeatedly uses the information screen 6, 8, or 12, he/she can select a desired key without viewing the information screen 6, 8, or 12. As shown in FIG. 1, an information screen may be represented by a virtual mouse 6, a virtual remote controller 8, a virtual keyboard 12, or some other type of virtual interface device. In addition, the information screen may have a predetermined pattern previously made by the user for games, medical diagnosis, or virtual reality. Here, the monitor 10 may be attached to the user's body in the form of glasses or a pad. When the information screen is represented by the virtual keyboard 12, the virtual keyboard 12 can have a variety of patterns to be suitable for the user's purpose according to the present invention. No matter what pattern the virtual keyboard 12 has, the virtual keyboard 12 is composed of a plurality of key groups, and each key group includes a plurality of keys. According to the present invention, a key group may include only character keys or both character and function keys. The character keys indicate keys denoting alphabet, numerals, or various symbols. The function keys indicate keys denoting function such as an Enter key and a Space key.

The wearable information input device shown in FIG. 1 of the present invention can be worn on a predetermined body part such as the hand, foot, head, arm, or leg and is provided with the sensing unit 4 for sensing motion of the predetermined body part in a plane or space.

Hereinafter, for clarity of the present invention, on the assumption that an information screen has the form of the virtual keyboard 12, an information input method using a wearable information input device according to the present invention will be described with reference to the attached drawings.

FIG. 2 is a flowchart of an embodiment of an information input method according to the present invention. The information input method of FIG. 2 includes displaying a virtual keyboard including a desired key in steps 60 through 66, selecting a desired key group on the virtual keyboard in steps 68 and 70, and selecting a desired key on the selected key group in step 72.

In an information input method according to the present invention, steps 60 through 68 of FIG. 2 can be selectively provided according to the number of a virtual keyboard 12 having patterns predetermined to be suitable for a user's purpose in using the virtual keyboard 12 and according to the patterns.

According to a first embodiment of the present invention, when only one virtual keyboard is currently displayed, and the virtual keyboard always includes a key that a user desires to select, steps 60 through 66 are not performed.

In order to select a desired key in an initial state in the first embodiment of an information input method, according to the present invention, a key group including the desired key is selected from the virtual keyboard by moving a first predetermined body part to which sensors are attached, in step 70. After step 70, the desired key is selected among the keys included in the selected key group by moving a second predetermined body part, in step 72, and key data corresponding to the selected desired key is determined as input information. After step 72, in order to select a new key, it is determined whether or not the new key is included in the previously selected key group, in step 68. According to the present invention, for example, the selected key group may have a higher luminance level than the other peripheral key groups or may be blinking so the selected key group can be discriminated from other key groups. If it is determined that the new key is not included in the previously selected key group, the procedure goes to step 70. However, if it is determined that the new key is included in the previously selected key group, the procedure goes to step 72.

According to a second embodiment of the present invention, when a plurality of virtual keyboards are currently displayed, and each virtual keyboard always includes a key which a user desires to select, steps 62 and 64 are not performed. In this case, an information input method according to the present invention further includes steps 60 and 66 in addition to steps 68 through 72 described above.

According to the second embodiment, it is determined whether a key which a user desires to select is included in the virtual keyboard 12, which is currently displayed on the monitor 10, in step 60. If it is determined that the desired key is not included in the currently displayed virtual keyboard 12 in step 60, a virtual keyboard including the desired key among a plurality of virtual keyboards is displayed in step 66, and the procedure goes to step 68. The following description concerns an embodiment of step 66 according to the present invention.

Figure 3:
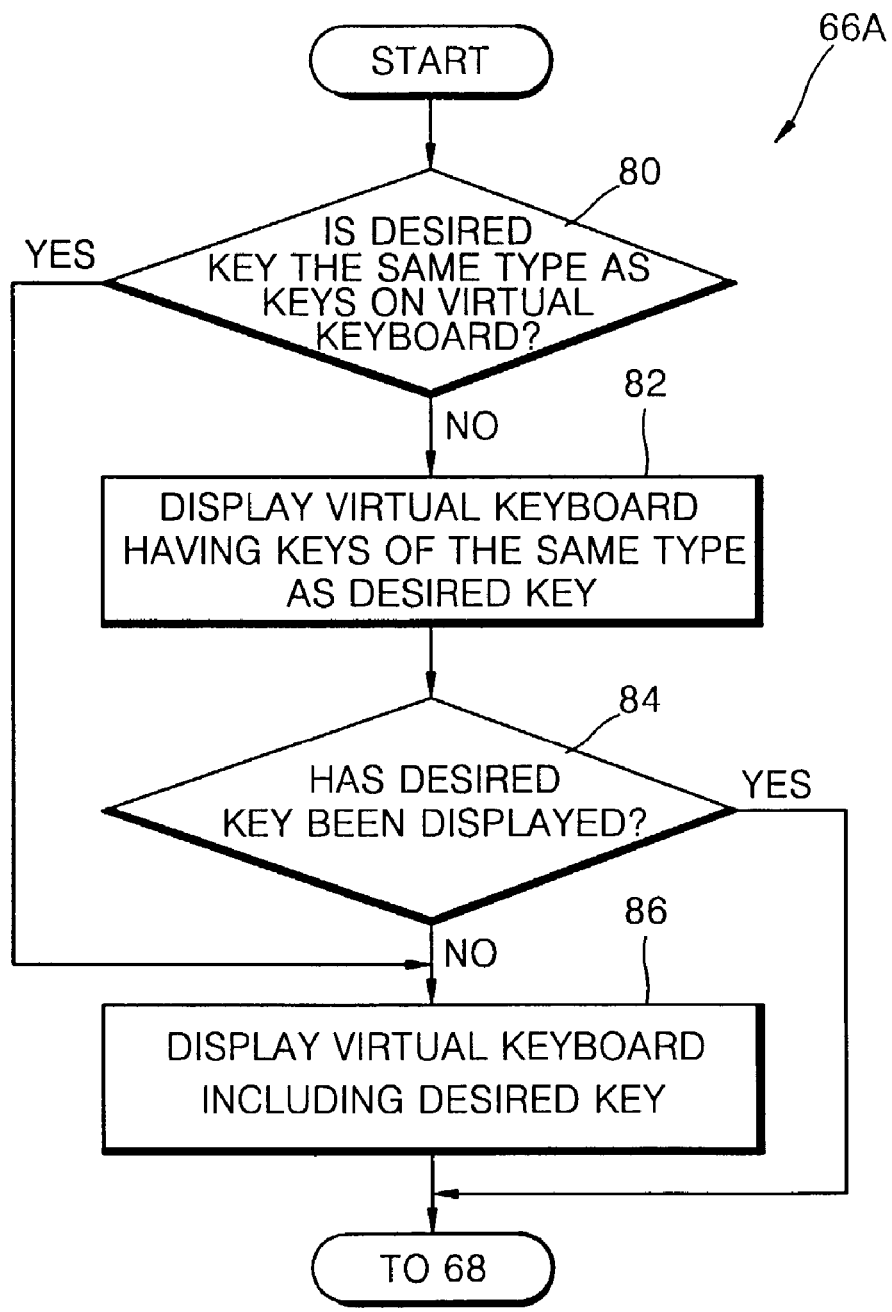
FIG. 3 is a flowchart of an embodiment of step 66 shown in FIG. 2 according to the present invention.

FIG. 3 is a flowchart of an embodiment 66A of step 66 shown in FIG. 2 according to the present invention. The embodiment 66A of step 66 includes displaying virtual keyboards having keys of the same type as a desired key in steps 80 and 82 and displaying a virtual keyboard including the desired key among the virtual keyboards which have the same type in steps 84 and 86.

Referring to FIG. 3, if it is determined that the desired key which the user wants to select is not included in the currently displayed virtual keyboard 12 in step 60, it is determined whether the desired key is the same type as keys included in the currently displayed virtual keyboard in step 80.

If it is determined that the desired key is not the same type as keys included in the currently displayed virtual keyboard, a virtual keyboard having keys of the same type as the desired key is displayed in step 82. According to the present invention, in order to perform step 82, a type conversion key can be selected by moving the second predetermined body part. If the type conversion key is selected, a virtual keyboard having keys of the same type as the desired key can be displayed. Alternatively, in order to perform step 82, the user can display a virtual keyboard having keys of the same type as the desired key by moving a third predetermined body part.

After step 82, it is determined whether the desired key is included in the currently displayed virtual keyboard having the keys of the same type as the desired key in step 84. If it is determined that the currently displayed keyboard includes the desired key, the procedure goes to step 68. However, if it is determined that the currently displayed keyboard does not include the desired key in step 84, or if it is determined that the keys included in the currently displayed virtual keyboard are the same type as the desired key in step 80, a virtual keyboard including the desired key is displayed in step 86, and the procedure goes to step 68. According to the present invention, in order to perform step 86, the user can make a virtual keyboard having the desired key displayed by moving the third predetermined body part, or by selecting a keyboard conversion key on the currently displayed virtual keyboard by moving the second predetermined body part. If it is determined that the desired key is included in the currently displayed virtual keyboard having the keys of the same type as the desired key in step 84, or after step 86, the procedure goes to step 68.

According to a third embodiment of the present invention, when a plurality of virtual keyboards are currently displayed, and at least one of the plurality of virtual keyboards may not include a key which a user desires to select, steps 60 through 72 of FIG. 2 are all performed.

According to the third embodiment, if it is determined that a key which a user desires to select is not included in a virtual keyboard 12 that is currently displayed on the monitor 10 in step 60, it is determined whether there is a virtual keyboard including the desired key in step 62. If it is determined that there is a virtual keyboard including the desired key, step 66 is performed. However, if it is determined that there is not a virtual keyboard including the desired key, the user moves the third predetermined body part to generate key data corresponding to the desired key in step 64. In step 64, if there are at least two key data that do not exist on the virtual keyboard, the user can generate at least two key data by moving the third predetermined body part a different number of times. For example, when a space key for generating key data of a space does not exist in the virtual keyboard, the user can generate a space by moving the third predetermined body part two times.

According to the present invention, a different number of times which the user moves the third predetermined body part can be set for steps 64, 82, and 86, respectively. For example, the number of times which the user moves the third predetermined body part can be set to two for performing step 64, to one for performing step 82, and to three for performing step 86.

According to a fourth embodiment of the present invention, at least one key among keys on a virtual keyboard can have at least two key data. In this case, after step 70, an information input method according to the present invention includes sequentially selecting at least two key data corresponding to a desired key by consecutively moving the second predetermined body part in step 72. Here, at least two key data corresponding to a single key can be consecutively selected by moving the third predetermined body part in step 72. An embodiment of step 72 according to the present invention will be described with reference to the attached drawings.

Figure 4:
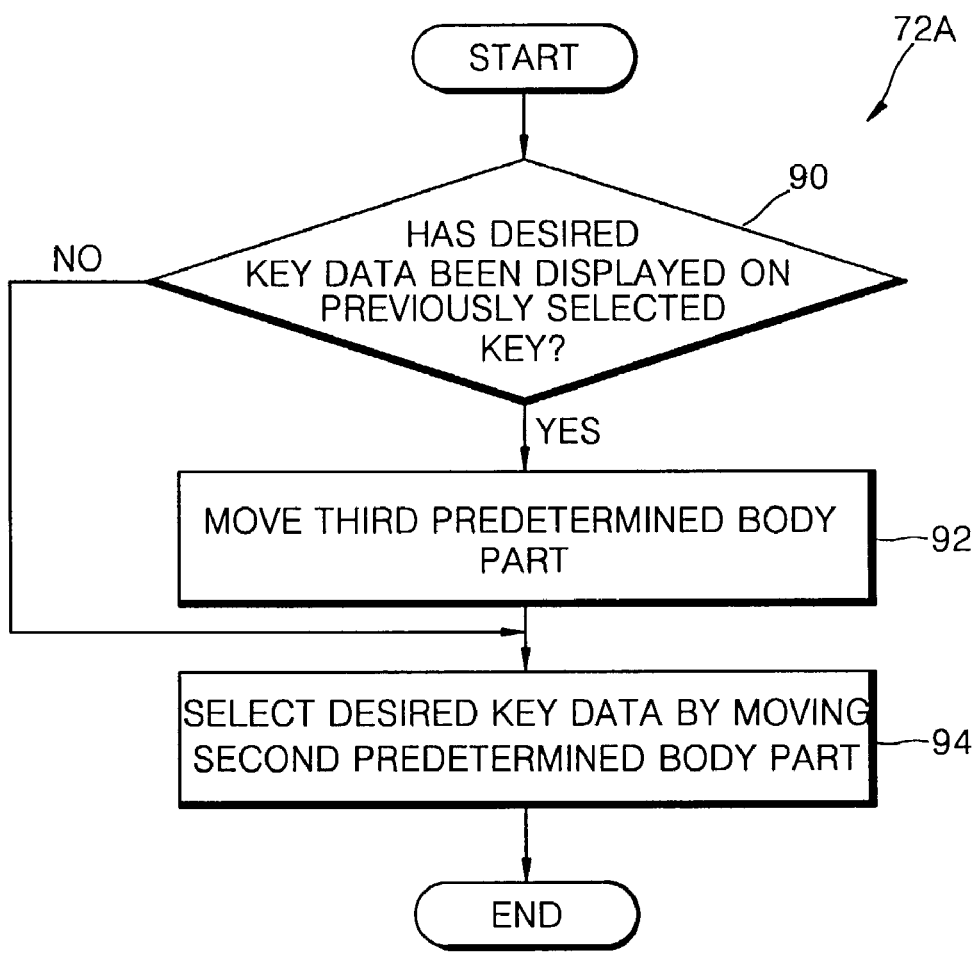
FIG. 4 is a flowchart of an embodiment of step 72 shown in FIG. 2 according to the present invention.

FIG. 4 is a flowchart of an embodiment 72A of step 72 shown in FIG. 2 according to the present invention. The embodiment 72A of step 72 includes moving the third predetermined body part according to whether key data desired to be selected is displayed on a previously selected key in steps 90 and 92 and selecting the desired key data in step 94.

Referring to FIG. 4, after step 70, it is determined whether key data currently desired to be selected has been displayed on a previously selected key in step 90. If it is determined that the desired key data has been displayed on the previously selected key, the third predetermined body part is moved in step 92. Step 92 is performed to move a cursor in order to distinctively select different key data displayed on a single key. If it is determined that the desired key data has not been displayed on the previously selected key, or after step 92, a key corresponding to the desired key data is selected by moving the second predetermined body part a predetermined number of times, thereby selecting the desired key data in step 94.

In the above four embodiments, among the predetermined body parts, the first is a hand, and the second and/or third are each a finger or a thumb. For example, the second or third can be a thumb, index finger, middle finger, ring finger, or little finger. According to the present invention, a sensor for detecting a motion of a hand and a sensor for detecting a motion of a finger can be attached to the same hand or to different hands.

The sensing unit 4 of a wearable information input device may have a variety of embodiments. For example, as shown in FIG. 1, when a predetermined body part is a hand, at least one sensor 40, 42, 44, or 46 for detecting a motion of at least one finger 16, 18, 20, or 22 and a sensor 48 for detecting a motion of a hand 14 can be attached to a glove or can be directly attached to the skin of a finger or hand.

For clarity of the present invention, on the assumption that among the predetermined body parts, the first one is the hand 14, the second one is the index finger 18, the middle finger 20, or the ring finger 22, the third one is the thumb 16, and the sensing unit 4 of a wearable information input device is realized as shown in FIG. 1, the above-described four embodiments of the present invention will be described in detail with reference to the attached exemplary patterns of the virtual keyboard 12.

The following description concerns the second embodiment of an information input method according to the present invention.

Figure 5A:
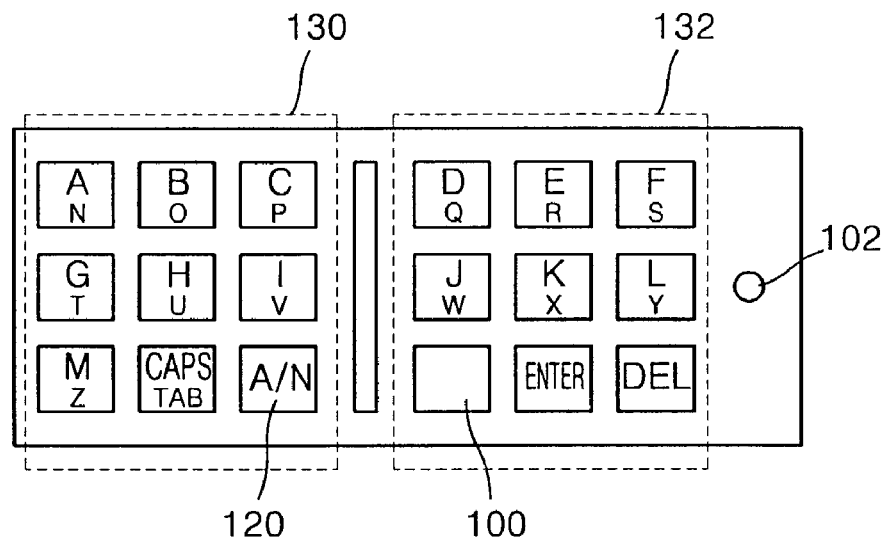
FIGS. 5A through 5D are diagrams of first embodiments of a virtual keyboard according to the present invention.
Figure 5B:
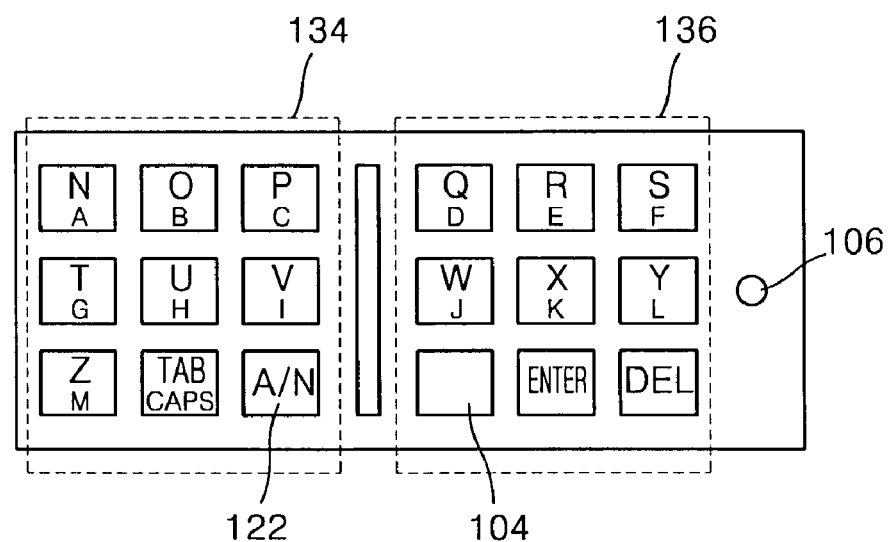
Figure 5C:
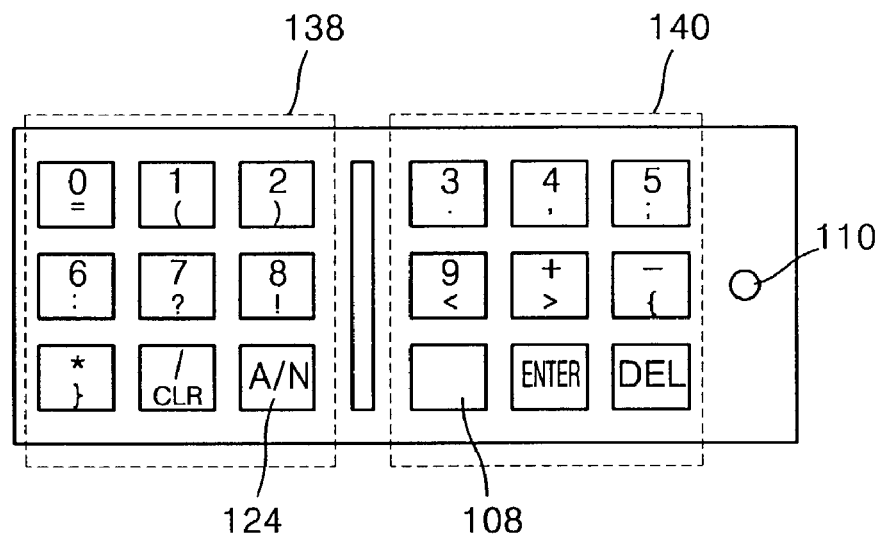
Figure 5D:
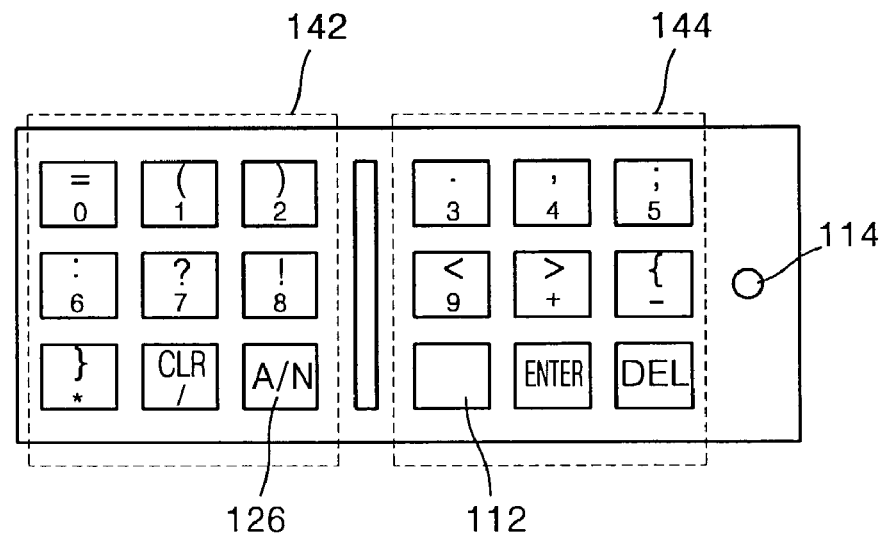

FIGS. 5A through 5D are diagrams of first embodiments of the virtual keyboard 12 displayed on the monitor 10 shown in FIG. 1 according to the present invention. A virtual keyboard shown in FIG. 5A is composed of two key groups 130 and 132. A virtual keyboard shown in FIG. 5B is composed of two key groups 134 and 136. A virtual keyboard shown in FIG. 5C is composed of two key groups 138 and 140. A virtual keyboard shown in FIG. 5D is composed of two key groups 142 and 144.

In step 60, it is determined whether a key which a user desires to select exists on a currently displayed virtual keyboard shown in FIG. 5A, 5B, 5C, or 5D. If it is determined that the desired key does not exist on the currently displayed virtual keyboard, a virtual keyboard including the desired key is displayed in step 66. For example, in the case where input information that the user desires to select is the alphabet, it is determined whether the currently displayed virtual keyboard is the virtual keyboard of FIG. 5A or 5B that has keys representing alphabet characters which the user wants to select. In the case where input information which the user desires to select is numerical, it is determined whether the currently displayed virtual keyboard is the virtual keyboard of FIG. 5C that has keys representing numerals which the user wants to select. In the case where input information which the user desires to select is a symbol, it is determined whether the currently displayed virtual keyboard is the virtual keyboard of FIG. 5D that has keys representing symbols which the user wants to select.

If it is determined that the keys included in the currently displayed virtual keyboard are not the same type as the desired key in step 80 of FIG. 3, an A/N key, i.e., a type conversion key, 120, 122, 124, or 126 among the keys shown in FIG. 5A, 5B, 5C, or 5D is selected by moving the second predetermined body part, thereby displaying a virtual keyboard including keys of the same type as the desired key in step 82, and the procedure goes to step 84. For example, in the case where the desired key is an alphabet key, if the virtual keyboard of FIG. 5C or 5D is currently displayed, the user selects the type conversion key (A/N) 124 or 126 using the second predetermined body part. If the type conversion key (A/N) 124 or 126 is selected, the currently displayed virtual keyboard of FIG. 5C or 5D is converted into the virtual keyboard of FIG. 5A or 5B. Here, when the type conversion key (A/N) 124 or 126 is selected, a display order can be set such that the virtual keyboard of FIG. 5A is displayed prior to the virtual keyboard of FIG. 5B, or the virtual keyboard of FIG. 5B is displayed prior to the virtual keyboard of FIG. 5A. However, if it is determined that the keys included in the currently displayed virtual keyboard are the same type as the desired key in step 80, or if it is determined that the desired key has not been displayed in step 84, a virtual keyboard including the desired key is displayed by moving the third predetermined body part in step 86, and the procedure goes to step 68. For example, in the case where the virtual keyboard of FIG. 5A is currently displayed, and the desired key is an alphabet key, if the desired key is included in the virtual keyboard of FIG. 5B, the third predetermined body part is moved to convert the currently displayed virtual keyboard from the virtual keyboard of FIG. 5A into the virtual keyboard of FIG. 5B.

Alternatively, if it is determined that the keys included in the currently displayed virtual keyboard are not the same type as the desired key in step 80 of FIG. 3, a virtual keyboard having keys of the same type as the desired key is displayed by moving the third predetermined body part in step 82, and the procedure goes to step 84. In other words, to perform step 82, the third predetermined body part is moved, instead of selecting a type conversion key. For example, in the case where the desired key is a symbol key and the virtual keyboard of FIG. 5A or 5B is currently displayed, the user can convert the virtual keyboard of FIG. 5A or 5B into the virtual keyboard of FIG. 5C or 5D by moving the third predetermined body part. Here, when the third predetermined body part is moved in a state where the virtual keyboard of FIG. 5A or 5B is displayed, display order can be set such that the virtual keyboard of FIG. 5C is displayed prior to the virtual keyboard of FIG. 5D, or the virtual keyboard of FIG. 5D is displayed prior to the virtual keyboard of FIG. 5C. However, if it is determined that the keys included in the currently displayed virtual keyboard are the same type as the desired key, the second predetermined body part is moved to select a keyboard conversion key (not shown) among keys on the currently displayed virtual keyboard, thereby displaying a virtual keyboard including the desired key in step 86, and the procedure goes to step 68. To perform step 86, the keyboard conversion key is selected, instead of moving the third predetermined body part. For example, in the case where the virtual keyboard of FIG. 5A is currently displayed and the desired alphabet key exists in the virtual keyboard of FIG. 5B, a keyboard conversion key is selected by moving the second predetermined body part in order to convert the currently displayed virtual keyboard from the virtual keyboard of FIG. 5A into the virtual keyboard of FIG. 5B. In this case, the keyboard conversion key can be provided at the position of each of the type conversion keys 120, 122, 124, and 126 of FIGS. 5A through 5D.

Meanwhile, when it is determined that the desired key exists on the currently displayed virtual keyboard, or after step 66, if it is determined that a key group including the desired key on the currently displayed virtual keyboard is not a previously selected key group, a key group including the desired key is selected by moving the hand in step 70. After step 70, the desired key is selected among keys included in the selected key group by moving the second predetermined body part in step 72.

It is assumed that a desired key group is selected among the key groups shown in FIGS. 5A through 5D by moving the hand 14 to the left or right, a row including a desired key is as a kind of key group selected by moving the hand 14 up or down in the selected key group, keys at the left, center, and right of the selected row are selected by moving the index finger 18, the middle finger 20, and the ring finger 22, respectively, step 86 is performed by moving the third predetermined body part, and step 82 is performed by selecting a type conversion key A/N by moving the ring finger 22. In addition, it is assumed that when a type conversion key A/N is selected, the virtual keyboard of FIG. 5A is displayed prior to the virtual keyboard of FIG. 5B, and the virtual keyboard of FIG. 5C is displayed prior to the virtual keyboard of FIG. 5D. Under these assumptions, an information input method for inputting the information "YEAR: 2001" using the virtual keyboards of FIGS. 5A through 5D according to the present invention will be described.

First, a procedure of selecting a desired "Y" key to determine key data "Y" as input information will be described. Because the initially displayed virtual keyboard of FIG. 5A is a virtual keyboard including keys of the same type as the desired "Y" key although the initially displayed virtual keyboard of FIG. 5A has the "Y" key, the virtual keyboard of FIG. 5B is displayed by moving the thumb 16 in step 86. Then, in step 70, the key group 136 including the "Y" key is selected by moving the hand 14 to the right, then a middle row including the "Y" key in the selected key group 136 is selected by moving the hand 14 up or down. After step 70, if the "Y" key is selected by moving the ring finger 22 in step 72, key data "Y" is determined as input information.

Next, a procedure of selecting an "E" key is performed. The currently displayed virtual keyboard of FIG. 5B does not have the "E" key but has keys of the same type as the "E" key. Accordingly, the virtual keyboard of FIG. 5A is displayed by moving the thumb 16 in step 86. Then, in step 70, the key group 132 including the "E" key is selected by moving the hand 14 to the right, then a top row including the "E" key in the selected key group 132 is selected by moving the hand 14 up. After step 70, if the "E" key is selected by moving the middle finger 20 in step 72, key data "E" is determined as input information.

Next, a procedure of selecting an "A" key is performed. The currently displayed virtual keyboard of FIG. 5A has the "A" key, and the "A" key is not included in the previously selected key group 132. Accordingly, the hand 14 used when selecting the "E" key is moved to the left to select the top row in the key group 130 including the "A" key in step 70. After step 70, if the "A" key is selected by moving the index finger 18 in step 72, key data "A" is determined as input information.

Next, a procedure of selecting an "R" key is performed. The currently displayed virtual keyboard of FIG. 5A does not have the "R" key but has keys of the same type as the "R" key. Accordingly, the virtual keyboard of FIG. 5B is displayed by moving the thumb 16 in step 86. Then, in step 70, the key group 136 including the "R" key is selected by moving the hand 14 to the right, and a top row including the "R" key in the selected key group 136 is selected by moving the hand 14 up. After step 70, if the "R" key is selected by moving the middle finger 20 in step 72, key data "R" is determined as input information.

Next, a procedure of selecting a blank is performed. Since the currently displayed virtual keyboard of FIG. 5B has a space key 104, a bottom row including the space key 104 is selected by moving the hand 14 down in step 70. After step 70, if the space key 104 is selected by moving the index finger 18 in step 72, key data of a blank is determined as input information.

Next, a procedure of selecting a ":" key is performed. Keys included in the currently displayed virtual keyboard of FIG. 5B do not include keys of the same type as the ":" key. Accordingly, in step 82, the key group 134 including the type conversion key (A/N) 122 is selected by moving the hand 14 to the left, a bottom row including the type conversion key (A/N) 122 in the selected key group 134 is selected by moving the hand 14 down, and the type conversion key (A/N) 122 is selected by moving the ring finger 22. Then, the procedure goes to step 84. The virtual keyboard of FIG. 5C currently displayed as a result of step 82 does not have the ":" key but has keys of the same type as the ":" key. Accordingly, the virtual keyboard of FIG. 5D is displayed by moving the thumb 16 in step 86. Then, in step 70, the key group 142 including the ":" key is selected by moving the hand 14 to the left, and a middle row including the ":" key in the selected key group 142 is selected by moving the hand 14 up or down. After step 70, if the ":" key is selected by moving the index finger 18 in step 72, key data ":" is determined as input information.

Next, a procedure of selecting a blank is performed. Since a space key 112 exists in the currently displayed virtual keyboard of FIG. 5D but is not included in the previously selected key group 142, in step 70 the key group 144 is selected by moving the hand 14 to the right, and a bottom row including the space key 112 is selected by moving the hand 14 down. After step 70, if the space key 112 is selected by moving the index finger 18 in step 72, key data of a blank is determined as input information.

Next, a procedure of selecting a "2" key is performed. The currently displayed virtual keyboard of FIG. 5D does not have the "2" key but has keys of the same type as the "2" key. Accordingly, the virtual keyboard of FIG. 5C is displayed by moving the thumb 16 in step 86. Then, in step 70, the key group 138 including the "2" key is selected by moving the hand 14 to the left, and a top row including the "2" key in the selected key group 138 is selected by moving the hand 14 up. After step 70, if the "2" key is selected by moving the ring finger 22 in step 72, key data "2" is determined as input information.

Next, a procedure of selecting "0", "0", and "1" is performed. The currently displayed virtual keyboard of FIG. 5C has both a "0" key and a "1" key, and the "0" key and the "1" key are included in the previously selected key group 138. Accordingly, if the "0" key, the "0" key, and the "1" key are selected by sequentially moving the index finger 18, the index finger 18, and the middle finger 20 in step 72, key data "0", "0", and "1" are sequentially determined as input information.

Here, each of capital letter lock light emitters 102, 106, 110, and 114 shown in FIGS. 5A through 5D emits light to inform a user that key data of capital letters has been selected.

Meanwhile, a user can select a key while viewing the display of selected key data. For this purpose, unlike the virtual keyboards shown in FIGS. 5A through 5D, the virtual keyboard 12 displays determined input information for the user. The following description concerns the second embodiment of an information input method using such a virtual keyboard displaying determined input information according to the present invention.

Figure 6A:
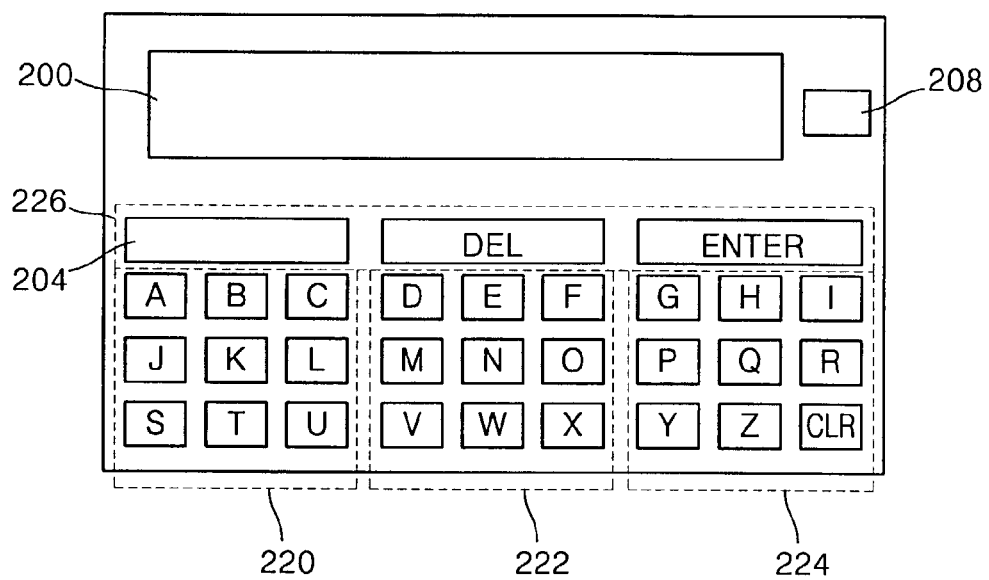
FIGS. 6A and 6B are diagrams of second embodiments of a virtual keyboard according to the present invention.
Figure 6B:
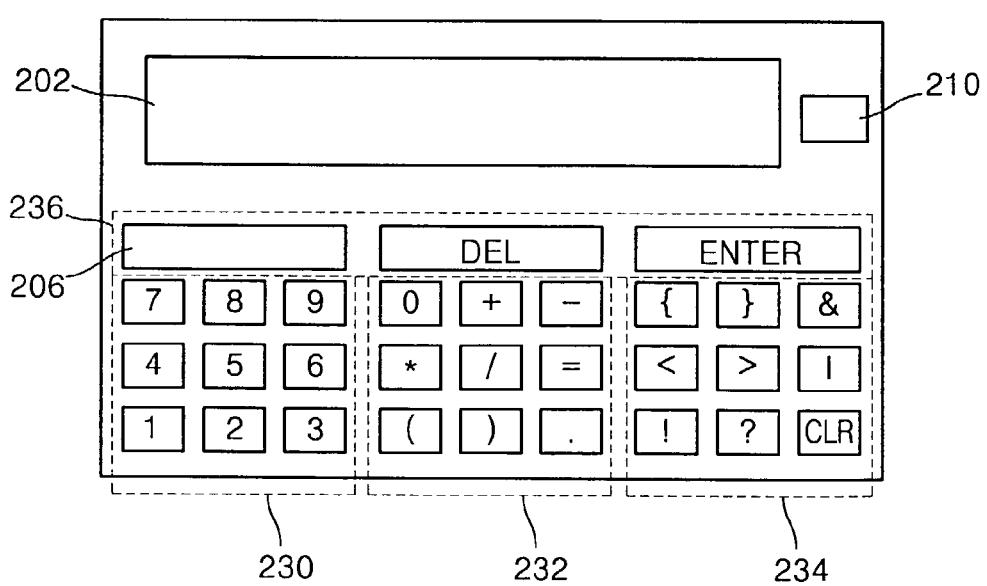

FIGS. 6A and 6B are diagrams of second embodiments of the virtual keyboard 12 displayed on the monitor 10 of FIG. 1 according to the present invention. A virtual keyboard shown in FIG. 6A includes four key groups 220, 222, 224, and 226. A virtual keyboard shown in FIG. 6B includes four key groups 230, 232, 234, and 236. Since only two virtual keyboards as shown in FIGS. 6A and 6B are used, steps 84 and 86 shown in FIG. 3 are not performed.

It is determined whether a key which a user desires to select exists on a currently displayed virtual keyboard shown in FIG. 6A or 6B in step 60. If it is determined that the desired key does not exist on the currently displayed virtual keyboard, a virtual keyboard including the desired key is displayed by moving the thumb 16 in step 82. If it is either determined that the desired key exists on the currently displayed virtual keyboard or after step 82, it is determined whether the desired key is included in a previously selected key group in step 68. If it is determined that the desired key is not included in the previously selected key group, a key group including the desired key on the currently displayed virtual keyboard is selected by moving the hand 14 in step 70. If it is either determined that the desired key is included in the previously selected key group or after step 70, the desired key is selected from the selected key group by moving the second predetermined body part in step 72.

It is assumed that a desired key group is selected among the key groups 220, 222, 224, 230, 232, and 234 shown in FIGS. 6A and 6B by moving the hand 14 to the left or right, a row including a desired key is selected by moving the hand 14 up or down in the selected key group, keys at the left, center, and right of the selected row are selected by moving the index finger 18, the middle finger 20, and the ring finger 22, respectively, and a space key 204 or 206, a Delete (DEL) key, and an Enter key at the top row in the virtual keyboard of FIG. 6A or 6B are selected by moving the index finger 18, the middle finger 20, and the ring finger 22, respectively. Under these assumptions, an information input method for inputting the information "YEAR 2001" using the virtual keyboards of FIGS. 6A and 6B according to the present invention will be described.

The initially displayed virtual keyboard of FIG. 6A has a "Y" key. Accordingly, in step 70, the key group 224 including the "Y" key is selected by moving the hand 14 to the right, and a bottom row including the "Y" key in the selected key group 224 is selected by moving the hand 14 down. After step 70, if the "Y" key is selected by moving the index finger 18 in step 72, key data "Y" is determined as input information.

Next, the currently displayed virtual keyboard of FIG. 6A has an "E" key, and the "E" key is not included in the previously selected key group 224. Accordingly, in step 70, the key group 222 including the "E" key is selected by moving the hand 14 slightly to the left, and a top row including the "E" key in the selected key group 222 is selected by moving the hand 14 up. After step 70, if the "E" key is selected by moving the middle finger 20 in step 72, key data "E" is determined as input information.

Next, the currently displayed virtual keyboard of FIG. 6A has an "A" key, and the "A" key is not included in the previously selected key group 222. Accordingly, in step 70, the key group 220 including the "A" key is selected by moving the hand 14 slightly to the left, and a top row including the "A" key in the selected key group 220 is selected. After step 70, if the "A" key is selected by moving the index finger 18 in step 72, key data "A" is determined as input information.

Next, the currently displayed virtual keyboard of FIG. 6A has an "R" key, and the "R" key is not included in the previously selected key group 220. Accordingly, in step 70, the key group 224 including the "R" key is selected by moving the hand 14 to the right, and a row including the "R" key in the selected key group 224 is selected by moving the hand 14 down. After step 70, if the "R" key is selected by moving the ring finger 22 in step 72, key data "R" is determined as input information.

Next, since the currently displayed virtual keyboard of FIG. 6A has the space key 204 and the space key 204 is not included in the previously selected key group 224, the key group 226 is selected by moving the hand 14 up in step 70. After step 70, if the space key 204 is selected by moving the index finger 18 in step 72, key data of a blank is determined as input information.

Next, since the currently displayed virtual keyboard of FIG. 6A does not have a "2" key, the virtual keyboard of FIG. 6B is displayed by moving the thumb 16 in step 82. Then, in step 70, the key group 230 including the "2" key is selected by moving the hand 14 to the left, and a bottom row including the "2" key in the selected key group 230 is selected by moving the hand 14 down. After step 70, if the "2" key is selected by moving the middle finger 20 in step 72, key data "2" is determined as input information.

Next, the currently displayed virtual keyboard of FIG. 6B has a "0" key, and the "0" key is not included in the previously selected key group 230. Accordingly, in step 70, the key group 232 including the "0" key is selected by moving the hand 14 slightly to the right, and a row including the "0" key in the selected key group 232 is selected by moving the hand 14 up. After step 70, if the "0" key is selected two times by moving the index finger 18 two times in step 72, key data "00" is determined as input information.

Next, the currently displayed virtual keyboard of FIG. 6B has a "1" key, and the "1" key is not included in the previously selected key group 232. Accordingly, in step 70, the key group 230 including the "1" key is selected, and a bottom row including the "1" key in the selected key group 230 is selected by moving the hand 14 down. After step 70, if the "1" key is selected by moving the index finger 18 in step 72, key data "1" is determined as input information.

The following description concerns the third and fourth embodiments of an information input method according to the present invention.

Figure 7A:
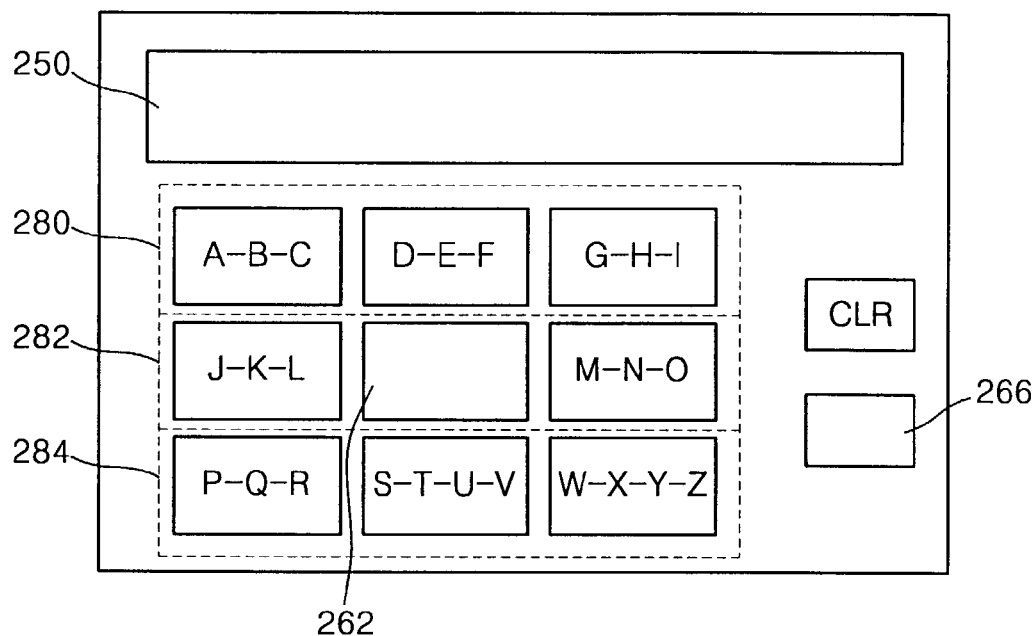
FIGS. 7A and 7B are diagrams of third embodiments of a virtual keyboard according to the present invention.
Figure 7B:
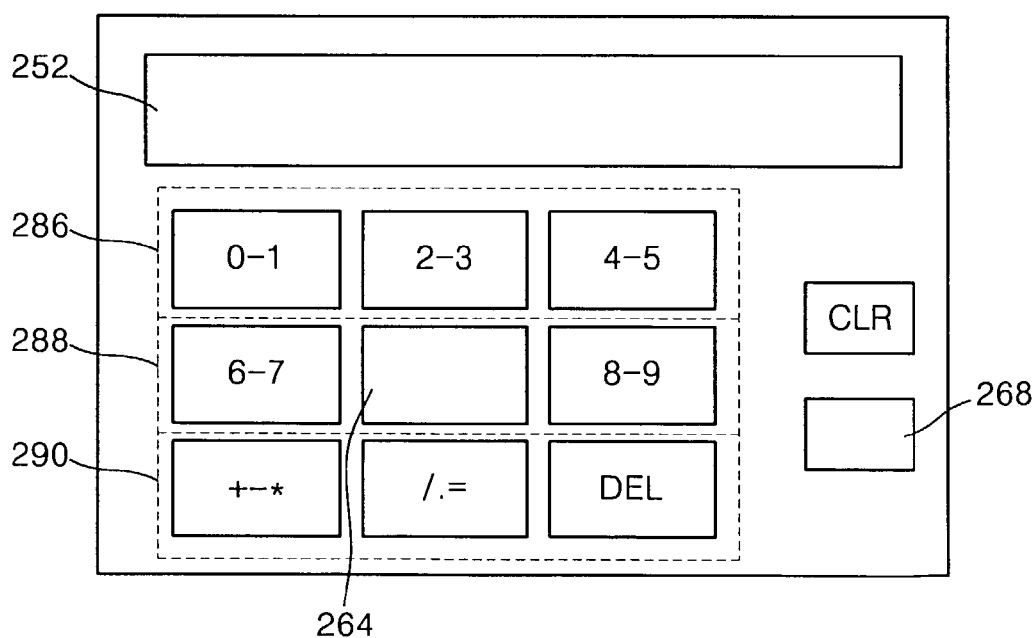

FIGS. 7A and 7B are diagrams of third embodiments of the virtual keyboard 12 displayed on the monitor 10 shown in FIG. 1 according to the present invention. A virtual keyboard shown in FIG. 7A includes three key groups 280, 282, and 284. A virtual keyboard shown in FIG. 7B includes three key groups 286, 288, and 290. Since only two virtual keyboards as shown in FIGS. 7A and 7B are used, steps 84 and 86 shown in FIG. 3 are not performed.

It is determined whether a key that a user desires to select exists on a currently displayed virtual keyboard in step 60. If it is determined that the desired key does not exist on the currently displayed virtual keyboard, it is determined whether there is a virtual keyboard including the desired key in step 62. If it is determined that the desired key does not exist, key data corresponding to the desired key is generated by moving the third predetermined body part a predetermined number of times in step 64. For example, when the desired key is a space key corresponding to key data of a blank, and when the space key does not exist on any one of the virtual keyboards shown in FIGS. 7A and 7B, the user generates key data of a blank by moving the third predetermined body part two times.

However, if it is determined that there is a virtual keyboard including the desired key, the virtual keyboard including the desired key is displayed in step 66. A key 262 or 264 shown in FIG. 7A or 7B may be used as a type conversion key A/N when step 82 is performed using a type conversion key and may be used as a space key when step 82 is performed using the third predetermined body part.

If it is either determined that the desired key exists on the currently displayed virtual keyboard, or after step 66, it is determined that the desired key is included in a previously selected key group in step 68. If it is determined that the desired key is not included in the previously selected key group, a key group including the desired key is selected among key groups on the currently displayed virtual keyboard by moving the first predetermined body part in step 70. However, if it is determined that the desired key is included in the previously selected key group, or after step 70, the desired key is selected from the selected key group by moving the second predetermined body part in step 72. Here, whenever the second predetermined body part is consecutively moved, three key data corresponding to a selected key are sequentially selected as input information. For example, a procedure of determining "CAB" composed of key data "C", "A", and "B" corresponding to an A-B-C key as input information will be described.

When "C" has already been determined as input information, the next desired key data "A" corresponds to a previously selected key. Accordingly, the third predetermined body part is moved a predetermined number of times in step 92. Alternatively, the second predetermined body part is moved to select a space key. For example, a cursor is moved to the right one time when the third predetermined body part is moved one time, and key data of a blank is selected as input information when the third predetermined body part is moved two times. Then, the A-B-C key is selected by moving the second predetermined body part one time in step 94, thereby determining the key data "A" as input information. Since the next desired key data "B" corresponds to the previously selected key, the third predetermined body part is moved the predetermined number of times in step 92. Then, the A-B-C key is selected by moving the second predetermined body part two times in step 94, thereby determining the key data "B" as input information.

It is assumed that a desired key group is selected among the key groups 280, 282, 284, 286, 288, and 290 shown in FIGS. 7A and 7B by moving the hand 14 up or down, keys at the left, center, and right of the selected key group are selected by moving the index finger 18, the middle finger 20, and the ring finger 22, respectively, a key 262 or 264 is used as a type conversion key A/N, and the thumb 16 functions as a space key. Under these assumptions, an information input method for inputting the information "YEAR 2001" using the virtual keyboards of FIGS. 7A and 7B according to the present invention will be described.

The virtual keyboard of FIG. 7A initially displayed on the monitor 10 has a "W-X-Y-Z" key corresponding to key data "Y". Accordingly, the key group 284 including the "W-X-Y-Z" key is selected by moving the hand 14 down in step 70. Then, if the "W-X-Y-Z" key is selected three times by moving the ring finger 22 three times in step 72, the key data "Y" is determined as input information.

Next, the currently displayed virtual keyboard of FIG. 7A has a "D-E-F" key corresponding to key data "E", but the "D-E-F" key is not included in the previously selected key group 284. Accordingly, the key group 280 including the "D-E-F" key is selected by moving the hand 14 up slightly in step 70. After step 70, if the "D-E-F" key is selected two times by moving the middle finger 20 two times in step 72, the key data "E" is determined as input information.

Next, the currently displayed virtual keyboard of FIG. 7A has an "A-B-C" key corresponding to key data "A", and the "A-B-C" key is included in the previously selected key group 280. Accordingly, if the "A-B-C" key is selected one time by moving the index finger 18 one time in step 72, the key data "A" is determined as input information.

Next, the currently displayed virtual keyboard of FIG. 7A has a "P-Q-R" key corresponding to key data "R", but the "P-Q-R" key is not included in the previously selected key group 280. Accordingly, the key group 284 including the "P-Q-R" key is selected by moving the hand 14 down in step 70. After step 70, if the "P-Q-R" key is selected three times by moving the index finger 18 three times in step 72, the key data "R" is determined as input information. Then, key data of a blank is generated by moving the thumb 16 a predetermined number of times, for example, two times in step 64.

Next, the currently displayed virtual keyboard of FIG. 7A does not have a key corresponding to key data "2". Accordingly, in step 66, the key group 282 in a middle portion is selected by moving the hand 14 up or down, and the type conversion key 262 in the selected key group 282 is selected by moving the middle finger 20, thereby displaying the virtual keyboard of FIG. 7B. Then, the key group 286 is selected by moving the hand 14 up in step 70. After step 70, if a "2–3" key in the selected key group 286 is selected one time by moving the middle finger 20 one time in step 72, the key data "2" is determined as input information.

Next, the currently displayed virtual keyboard of FIG. 7B has a "0–1" key corresponding to key data "0", and the "0–1" key is included in the previously selected key group 286. Accordingly, if the "0–1" key is selected one time by moving the index finger 18 one time in step 72, the key data "0" is determined as input information.

Since the next desired key data "0" corresponds to the previously selected "0–1" key, the thumb 16 is moved one time in step 92. After step 92, if the "0–1" key is selected one time by moving the index finger 18 one time in step 94, the key data "0" is determined as input information.

Since the next desired key data "1" corresponds to the previously selected "0–1" key, the thumb 16 is moved one time in step 92. After step 92, if the "0–1" key is selected two times by moving the index finger 18 two times in step 94, the key data "1" is determined as input information.

Besides the above-described four embodiments, a fifth embodiment of an information input method according to the present invention will be described with reference to the attached drawings.

Figure 8:
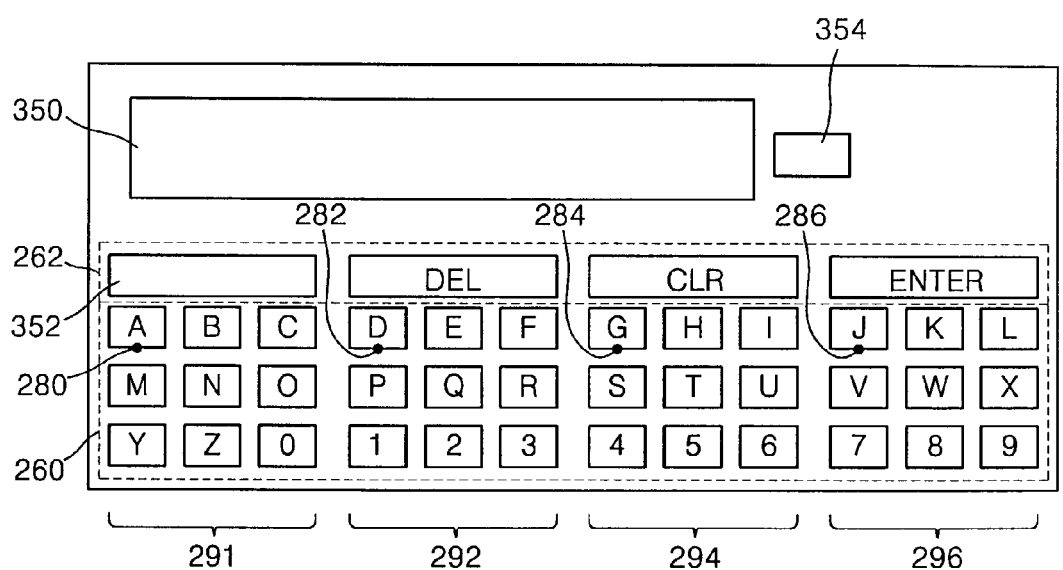
FIG. 8 is a diagram showing a fourth embodiment of a virtual keyboard according to the present invention.

FIG. 8 is a diagram showing a fourth embodiment of the virtual keyboard 12 displayed on the monitor 10 shown in FIG. 1 according to the present invention. A virtual keyboard shown in FIG. 8 includes two key groups 260 and 262 and four indicating points 280, 282, 284, and 286 for allowing a user to recognize a currently selected key. In an information input method using the virtual keyboard of FIG. 8 according to the present invention, steps 60 through 66 shown in FIG. 2 are not performed.

In the information input method using the virtual keyboard of FIG. 8 according to the present invention, a key group including a desired key is selected from the key groups 260 and 262 by moving the hand 14 up or down in step 70. After step 70, the desired key is selected from the selected key group by moving the second predetermined body part in step 72. If the key group 262 is selected, in step 72 a space key 352 is selected by moving the thumb 16, a DEL key is selected by moving the index finger 18, a Clear (CLR) key is selected by moving the middle finger 20, or an Enter key is selected by moving the ring finger 22. If the key group 260 is selected, in step 72 the relevant indicating point 280, 282, 284, or 286 is positioned at the desired key by moving the hand 14 up, down, left, or right, and the desired key is selected by moving the second predetermined body part. Here, when the hand 14 is moved up, down, left, or right, the four indicating points 280, 282, 284, and 286 may move simultaneously. Then, a key in a first section 291 is selected when moving the thumb 16, a key in a second section 292 is selected when moving the index finger 18, a key in a third section 294 is selected when moving the middle finger 20, and a key in a fourth section 296 is selected when moving the ring finger 22.

Hereinafter, an information input method for inputting the information "YEAR 2001" using the virtual keyboard of FIG. 8 according to the present invention will be described.

The key group 260 is selected by moving the hand 14 down in step 70. After step 70, in step 72 the indicating point 280 is positioned at a "Y" key by moving the hand 14 up, down, left, or right, and the "Y" key is selected by moving the thumb 16, thereby determining key data "Y" as input information. Next, an "E" key is included in the currently selected key group 260. Accordingly, in step 72 the indicating point 282 is positioned at the "E" key by moving the hand 14 up, down, left, or right, and the "E" key is selected by moving the index finger 18, thereby determining key data "E" as input information. Next, an "A" key is included in the currently selected key group 260. Accordingly, in step 72 the indicating point 280 is positioned at the "A" key by moving the hand 14 up, down, left, or right, and the "A" key is selected by moving the thumb 16, thereby determining key data "A" as input information. Next, an "R" key is included in the currently selected key group 260. Accordingly, in step 72 the indicating point 282 is positioned at the "R" key by moving the hand 14 up, down, left, or right, and the "R" key is selected by moving the index finger 18, thereby determining key data "R" as input information.

Next, since the space key 352 is not included in the previously selected key group 260, the key group 262 is selected by moving the hand 14 up in step 70. After step 70, the space key 352 is selected by moving the thumb 16 in step 72, thereby determining key data of a blank as input information.

Next, since a "2" key is not included in the current selected key group 262, the key group 260 is selected by moving the hand 14 down in step 70. After step 70, in step 72 the indicating point 282 is positioned at the "2" key by moving the hand 14 up, down, left, or right, and the "2" key is selected by moving the index finger 18, thereby determining key data "2" as input information. Next, a "0" key is included in the currently selected key group 260. Accordingly, in step 72 the indicating point 280 is positioned at the "0" key by moving the hand 14 up, down, left, or right, and the "0" key is consecutively selected two times by-moving the thumb 16 two times, thereby determining key data "00" as input information. Next, a "1" key is included in the currently selected key group 260. Accordingly, in step 72 the indicating point 282 is positioned at the "1" key by moving the hand 14 up, down, left, or right, and the "1" key is selected by moving the index finger 18, thereby determining key data "1" as input information.

Each of the virtual keyboards shown in FIGS. 6A through 8 may be provided with a virtual liquid crystal window 200, 202, 250, 252, or 350 for displaying key data selected by a user. Key data displayed on the virtual liquid crystal window 200, 202, 250, 252, or 350 can be cleared by selecting a CLR key. Accordingly, the user can check whether a desired key is correctly selected, through the liquid crystal window 200, 202, 250, 252, or 350. Each of the virtual keyboards shown in FIGS. 6A through 8 may be additionally provided with a Quit key 208, 210, 266, 268, or 354 allowing the user to remove a displayed virtual keyboard from the screen of the monitor 10.

Consequently, an information input method according to the present invention allows a user to select a key group including a desired key on an information screen displayed on the monitor 10 by moving his/her hand to the left or right and to select the desired key among keys included in the selected key group by moving his/her finger. For this, the sensing unit 4 of a wearable information input device can be provided with the sensor 48 for sensing the leftward or rightward motion of the hand and the sensors 40, 42, 44, and 46 for sensing the motions of the thumb 16, the index finger 18, the middle finger 20, and the ring finger 22, respectively. There are many conventional embodiments of a wearable information input device for matching the result of sensing of the sensing unit 4 with the information screen.

Hereinafter, for clarity of an information input method of the present invention, the configuration and operation of an embodiment of a wearable information input device and an information input method performed by the information input device will be described with reference to the attached drawings.

Figure 9:
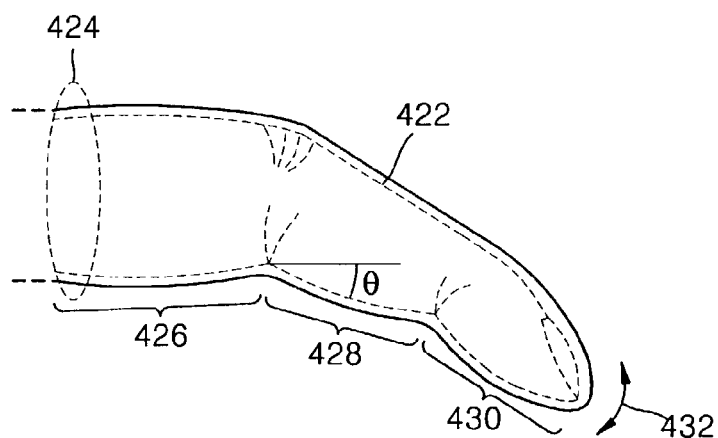
FIG. 9 is a diagram of a finger for explaining a finger angle which is sensed by a sensing unit.

FIG. 9 is a diagram of a finger 422 for explaining a finger angle θ which is sensed by the sensing unit 4. Referring to FIGS. 1 and 9, a user moves the finger 422 up or down, as illustrated by an arrow 432, while viewing the information screen 6, 8, or 12 displayed on the monitor 10 to select desired information to be input among a plurality of pieces of information. The information input device senses the bend of the finger 422 using the sensing unit 4, detects a finger angle θ, at which the finger 422 is bent, from the result of sensing, and selects information, which the user wishes, based on the detected finger angle θ.

Figure 10:
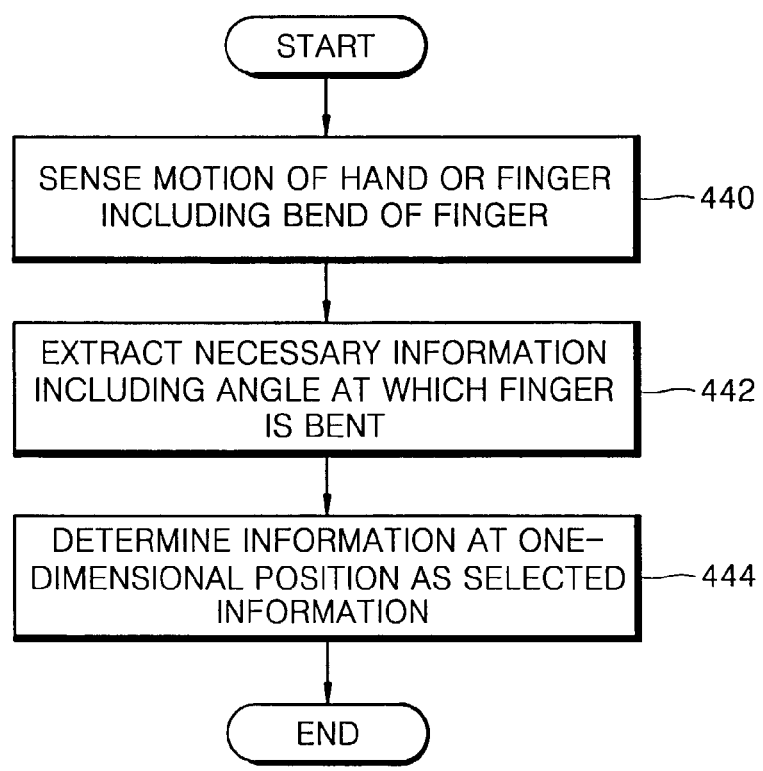
FIG. 10 is a flowchart of an information input method using a finger angle.

FIG. 10 is a flowchart of an information input method using a finger angle. The information input method includes obtaining necessary information from the motion of a finger or hand in steps 440 and 442, and selecting information located at a one-dimensional position derived from the obtained information in step 444.

Figure 11:
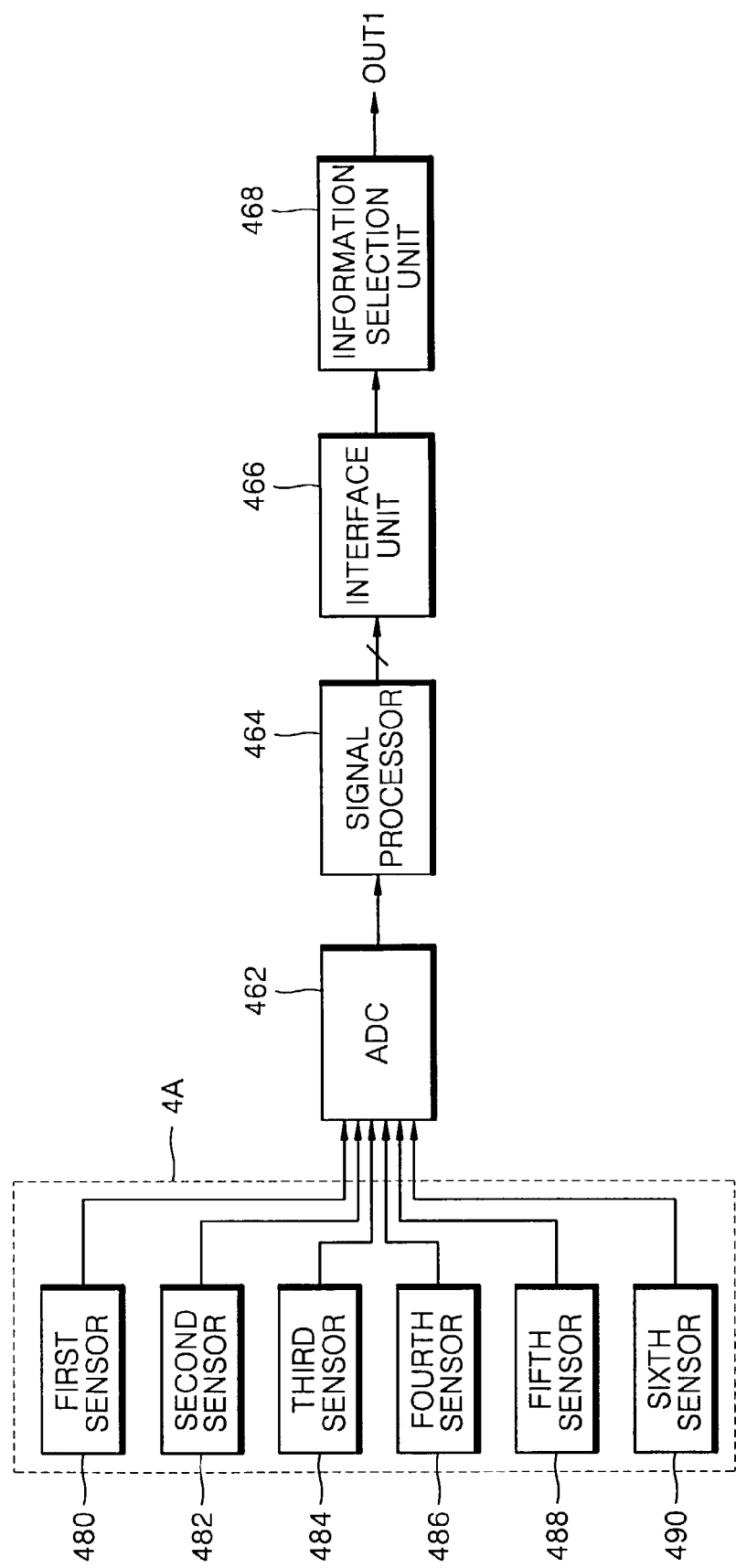
FIG. 11 is a block diagram of an embodiment of an information input device for performing the information input method of FIG. 10.

FIG. 11 is a block diagram of a preferred embodiment of an information input device for performing the information input method of FIG. 10. The information input device includes a sensing unit 4A, an analog-to-digital converter (ADC) 462, a signal processor 464, an interface unit 466, and an information selection unit 468.

The sensing unit 4A of FIG. 11 is an embodiment of the sensing unit 4 of FIG. 1 and includes a first sensor 480 and at least one of second through sixth sensors 482, 484, 486, 488, and 490. Each of the first through sixth sensors 480, 482, 484, 486, 488, and 490 can be attached to a member having a glove shape which is worn on a hand and fingers, as shown in FIG. 1.

When a user moves at least one finger 422 to select desired information among a plurality of pieces of information included in the information screen, the first sensor 480 senses the bend of the finger 422 and outputs the result of sensing in step 440. When selecting the information, the user may or may not see the information screen. The result of sensing output from the first sensor 480 may have an analog or digital form according to the type of implement of the first sensor 480. When the result of sensing output from the first sensor 480 has an analog form, the ADC 462 is additionally provided between the sensing unit 4A and the signal processor 464, as shown in FIG. 11. The ADC 462 converts at least one result of sensing output from the sensing unit 4A into a digital form and outputs the result of conversion to the signal processor 464. For example, the ADC 462 can perform Pulse Width Modulation (PWM) on a voltage output from the sensing unit 4A in an analog form and output the result of PWM to the signal processor 464.

Hereinafter, the configurations and operations of embodiments of the first sensor 480 will be described with reference to the attached drawings.

Figure 12:
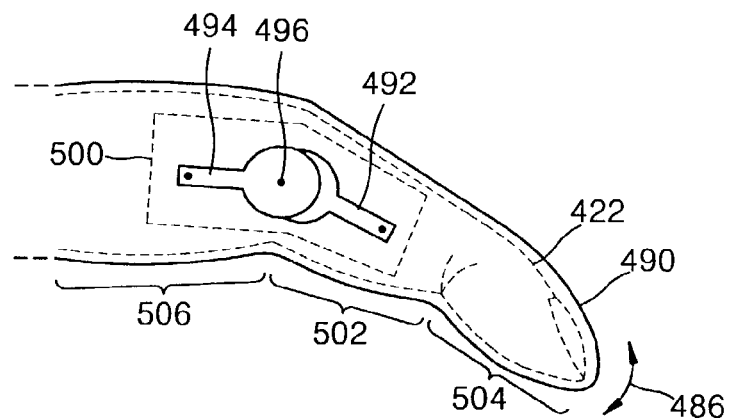
FIG. 12 is a diagram of the appearance of a first embodiment of a first sensor shown in FIG. 11.

FIG. 12 is a diagram of the appearance of a first embodiment of the first sensor 480 shown in FIG. 11. FIG. 12 shows a glove 490 worn on the finger 422 and a first sensor 500 attached to the glove 490.

Referring to FIG. 12, the first sensor 500 may be realized as a variable resistor which is disposed to extend from one segment to another segment of the finger 422, varies resistance according to a finger angle θ formed when a user moves the finger 422 up or down, and outputs the result of sensing having a level corresponding to the varied resistance. The segments of the finger 422 may be a third segment 506 and a second segment 502, as shown in FIG. 12, or may be the third segment 506 and a first segment 504, unlike FIG. 12.

For this, the first sensor 500 may include a first fixed member 494, a first moving member 492, and a central axis 496. The first fixed member 494 is attached to one segment of the finger 422, and the first moving member 492 is attached to another segment of the finger 422. The first fixed member 494 and the first moving member 492 are connected to each other by the central axis 496 to thus operate together. When the finger 422 is moved up or down as illustrated by an arrow 486, the first fixed member 494 does not move, but the first moving member 492 moves. Accordingly, the first sensor 500 varies resistance according to the motion of the first moving member 492 as follows.

Figure 13:
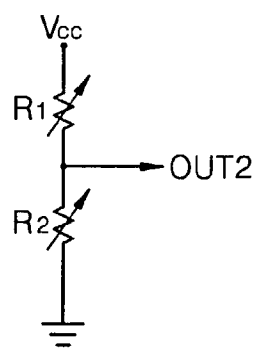
FIG. 13 is a diagram of an equivalent circuit of the first sensor shown in FIG. 12.

FIG. 13 is a diagram of an equivalent circuit of the first sensor 500 shown in FIG. 12. The equivalent circuit includes resistors R1 and R2. Referring to FIG. 13, when the finger 422 is spread out without being bent, the resistors R1 and R2 have the same value. As the finger 422 is bent downward, the resistors R1 and R2 have different values. Accordingly, as the finger 422 is bent, a voltage value output through an output terminal OUT2 changes. Consequently, the first sensor 500 of FIG. 12 outputs a voltage having a level varying with a bend of the finger 422 as the result of sensing.

Figure 14:
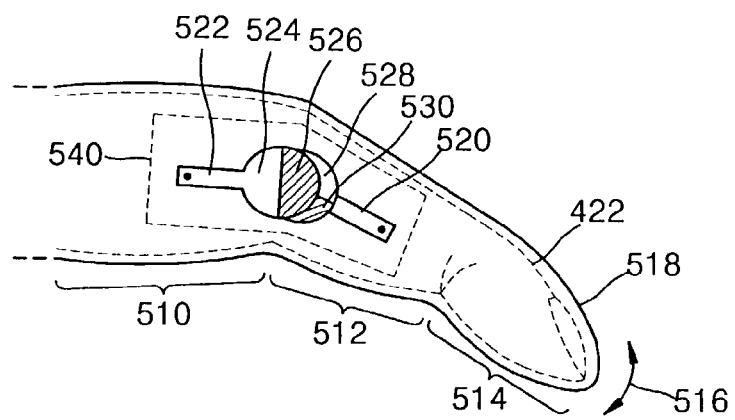
FIG. 14 is a diagram of the appearance of a second embodiment of the first sensor shown in FIG. 11.

FIG. 14 is a diagram of the appearance of a second embodiment of the first sensor 480 shown in FIG. 11. FIG. 14 shows a glove 518 worn on the finger 422 and a first sensor 540 attached to the glove 518.

Referring to FIG. 14, the first sensor 540 may be realized as a variable capacitor, that is, a trimmer capacitor, which is disposed to extend from one segment to another segment of the finger 422, varies capacitance according to a finger angle θ at which the finger 422 is bent, and outputs the result of sensing having a level corresponding to the varied capacitance. The segments of the finger 422 may be a third segment 510 and a second segment 512, as shown in FIG. 14, or may be the third segment 510 and a first segment 514, unlike FIG. 14.

The first sensor 540 may include a second fixed member 522 and a second moving member 520. The second fixed member 522 is attached to one segment of the finger 422 and has a nonconductor 524 and a conductor 526. The second moving member 520 is attached to another segment of the finger 422 and has a nonconductor 528 and a conductor 530. As the finger 422 is bent, that is, as the finger is moved up or down as illustrated by an arrow 516, the second fixed member 522 does not move, but the second moving member 520 moves. Accordingly, an area in which the conductor 526 of the second fixed member 522 overlaps the conductor 530 of the second moving member 520 changes as the finger 422 is bent. A change in the area of an overlap causes capacitance to change. Here, the first sensor 540 outputs a voltage, which has a level varying with a variation of capacitance, in an analog form as the result of sensing.

Figure 15A:
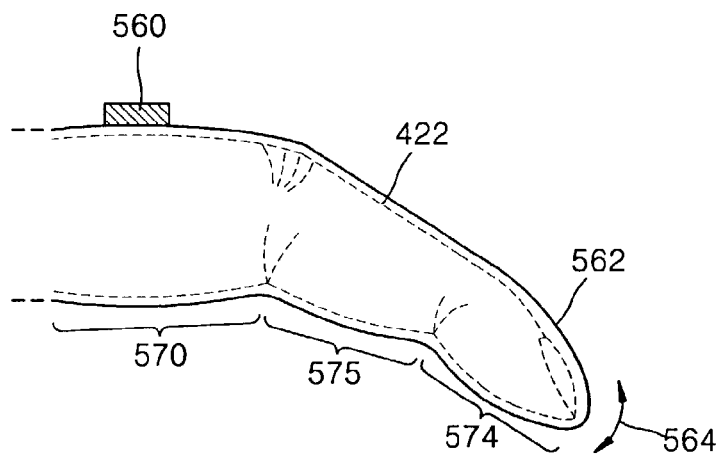
FIGS. 15A through 15C are diagrams of the appearances of a third embodiment of the first sensor shown in FIG. 11.
Figure 15B:
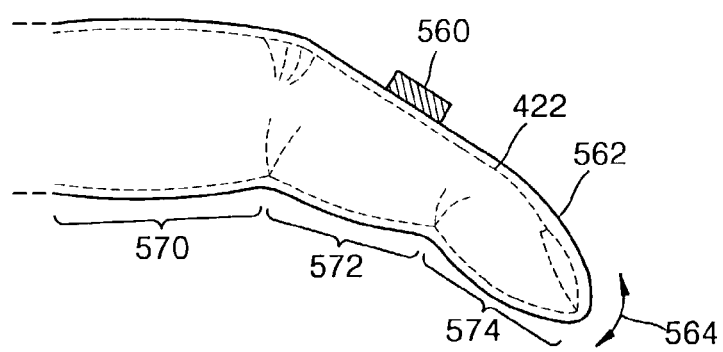
Figure 15C:
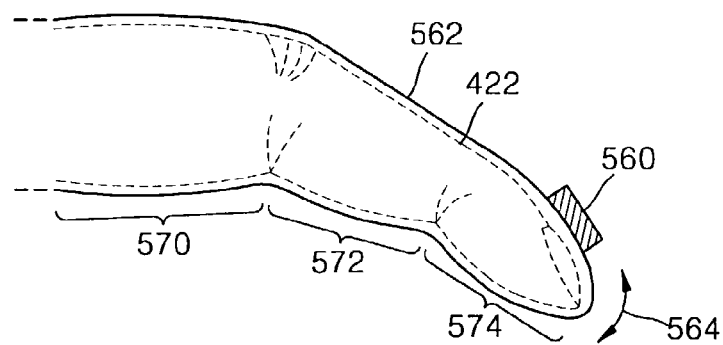

FIGS. 15A through 15C are diagrams of the appearances of a third embodiment of the first sensor 480 shown in FIG. 11. FIGS. 15A through 15C show a glove 562 worn on the finger 422 and a first sensor 560 attached to the glove 562.

Referring to FIGS. 15A through 15C, the first sensor 560 may be disposed in any segment of the finger 422 and may be realized as an inertial sensor which senses an angle at which the finger 422 is bent and outputs the result of sensing. Here, the inertial sensor 560 may be attached to a third segment 570 as shown in FIG. 15A, to a second segment 572 as shown in FIG. 15B, or to a first segment 574 as shown in FIG. 15C. For this, the inertial sensor 560 can be realized as a gyro sensor (not shown) or an acceleration sensor (not shown). When the inertial sensor 560 is realized as a gyro sensor, the inertial sensor 560 detects an angular velocity which varies as the finger 422 is moved up or down as illustrated by an arrow 564 and outputs a voltage, which has a level corresponding to the detected angular velocity, in an analog form as the result of sensing. However, when the inertial sensor 560 is realized as an acceleration sensor, the inertial sensor 560 detects acceleration which varies as the finger 422 is moved up or down as illustrated by the arrow 564 and outputs a voltage, which has a level corresponding to the detected acceleration, in an analog or digital form as the result of sensing.

Figure 16:
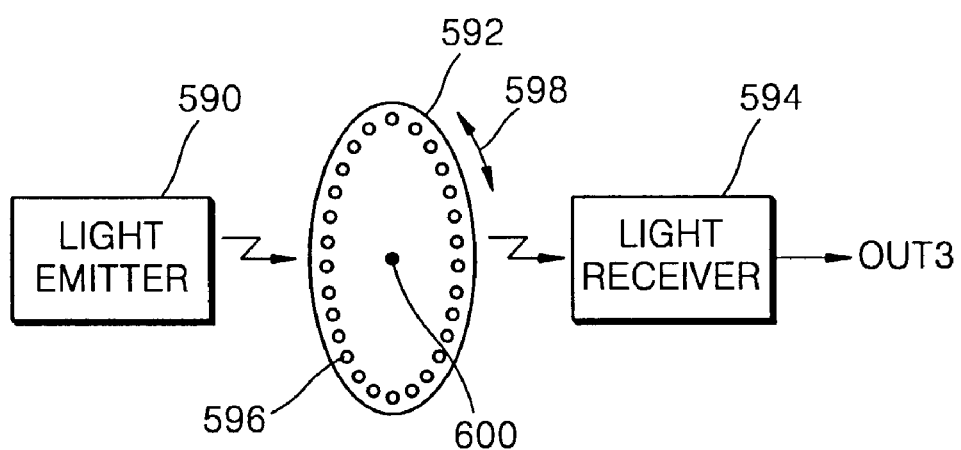
FIG. 16 is a block diagram of a fourth embodiment of the first sensor shown in FIG. 11.

FIG. 16 is a block diagram of a fourth embodiment of the first sensor 480 shown in FIG. 11. The fourth embodiment of the first sensor 480 includes a light emitter 590, a rotary circular plate 592, and a light receiving unit 594.

Referring to FIG. 16, the rotary circular plate 592 rotates around a central axis 600 clockwise or counterclockwise, as illustrated by the arrow 598, when the finger 422 is bent, and the rotary circular plate 592 has a plurality of holes 596 at its outer portion. The light emitter 590 radiates light at the holes 596 on the rotary circular plate 592. The light receiver 594 receives light transmitted through the holes 596, converts the received light into an electrical signal, and outputs the electrical signal through an output terminal OUT3 as the result of sensing. For example, once the finger 422 is bent to select information, the rotary circular plate 592 rotates clockwise or counterclockwise, as illustrated by an arrow 598, and the light receiver 594 outputs an electrical signal in a digital form through the output terminal OUT3. The electrical signal consists of pulses generated according to the rotation of the rotary circular plate 592. Here, the number of pulses is different per hour. Accordingly, the ADC 462 of FIG. 11 is not necessary in this embodiment. The configuration and operation of the first sensor of FIG. 16 are the same as those of a rotary encoder.

Figure 17:
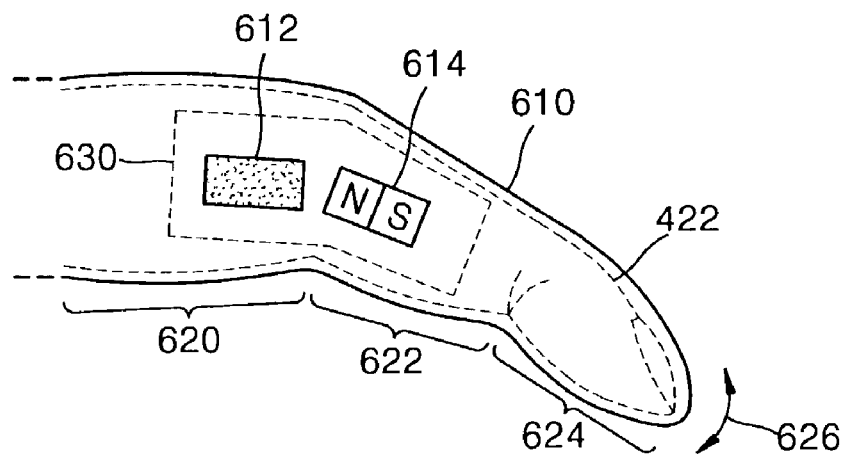
FIG. 17 is a diagram of the appearance of a fifth embodiment of the first sensor shown in FIG. 11.

FIG. 17 is a diagram of the appearance of a fifth embodiment of the first sensor 480 shown in FIG. 11. FIG. 17 shows a glove 610 worn on the finger 422 and a first sensor 630 attached to the glove 610.

Referring to FIG. 17, the first sensor 630 includes a magnet 614 and a flux direction measurer 612. The magnet 614 is disposed in one segment of the finger 422, and the flux direction measurer 612 is disposed in another segment of the finger 422 in the direction of magnetic flux induced by the magnet 614. The flux direction measurer 612 measures the direction of magnetic flux and outputs the measured direction as the result of sensing. It is preferable that the segment to which the magnet 614 is attached is close to the end of the finger 422 (outer segment), and the segment to which the flux direction measurer 612 is attached is close to the base of the finger 422 (inner segment). Since the output of the flux direction measurer 612 may be connected to the ADC 462 via wires, it is preferable to dispose the flux direction measurer 612 in an inner segment which moves less and to dispose the magnet 614 in an outer segment which moves more. Here, as shown in FIG. 17, the outer segment can be a second segment 622 counted from the end of the finger 422, and the inner segment can be a third segment 620 counted from the end of the finger 422. Alternatively, unlike FIG. 17, the outer segment can be a first segment 624 counted from the end of the finger 422, and the inner segment can be the third segment 620 counted from the end of the finger 422. The flux direction measurer 612 detects the direction of magnetic flux varying as the finger 422 is bent up or down as illustrated by an arrow 626 and outputs the detected direction as the result of sensing in an analog form. For this, the flux direction measurer 612 can be realized as a giant magneto resistive (GMR) sensor (not shown).

The first sensor 480 or any one of its embodiments can be attached to any segment of at least one among the fingers of the right hand and/or the left hand. However, as described above, it is preferable to dispose the first sensor 480 and its embodiments at a portion of the finger 422 where the change of angles through which the finger 422 is bent is a maximum when a user bends the finger 422 to select information.

In addition to a bend of the finger 422, the sensing unit 4A of FIG. 11 can sense other motions of the hand or finger 422 as follows in step 440. The second sensor 482 senses an up or down motion of the finger 422 and outputs the result of sensing. The third sensor 484 senses an up or down motion of the hand and outputs the result of sensing. The fourth sensor 486 senses a leftward or rightward motion of the hand and outputs the result of sensing. The fifth sensor 488 senses a leftward or rightward motion of the finger 422 and outputs the result of sensing. The sixth sensor 490 senses a motion of a third knuckle 424 counted from the end of the finger 422 and outputs the result of sensing. The sixth sensor 490 may be disposed in the first, second, or third segment 426, 428, or 430 of the finger 422. Here, the second sensor 482, the fifth sensor 488, and/or the sixth sensor 490 can be disposed at any segment of at least one finger 422 of the right hand and/or the left hand. The third sensor 484 and/or the fourth sensor 486 can be disposed on the palm and/or the back of the right hand and/or the left hand. However, it is preferable that each of the second, third, fourth, fifth, and sixth sensors 482, 484, 486, 488, and 490 is disposed at a segment where the range of a motion of the hand or finger is a maximum.

Each of the second, third, fourth, fifth, and sixth sensors 482, 484, 486, 488, and 490 shown in FIG. 11 can be realized as an inertial sensor. For example, an inertial sensor (not shown) realizing the second, fifth, or sixth sensor 482, 488, or 490 is attached to the finger 422, senses the upward, downward, leftward, or rightward motion of the finger 422 or the motion of the third knuckle 424, and outputs the result of sensing. An inertial sensor (not shown) realizing the third or fourth sensor 484 or 486 is attached to the hand, senses the upward, downward, leftward, or rightward motion of the hand, and outputs the result of sensing. The inertial sensor realizing each of the second, third, fourth, fifth, and sixth sensors 482, 484, 486, 488, and 490 can be realized as a gyro sensor (not shown) or an acceleration sensor (not shown). When the inertial sensor is realized as a gyro sensor, the inertial sensor outputs a voltage, which has a level corresponding to angular velocity which varies according to the motion of the hand or finger, in an analog form as the result of sensing. However, when the inertial sensor is realized as an acceleration sensor, the inertial sensor outputs a voltage, which has a level corresponding to acceleration which varies according to the motion of the hand or finger, in an analog or digital form as the result of sensing.

The results of sensing output from the second, third, fourth, and fifth sensors 482, 484, 486, and 488 are used for recognizing information selected by a user in the information screen. The result of sensing output from the sixth sensor 490 is used for determining whether the user is to input the information selected on the information screen.

After step 440, the signal processor 464 calculates an angle θ, at which the finger 422 is bent, from the result of sensing received from the first sensor 480 in step 442. If the first sensor 480 is realized as shown in FIG. 12, 14, 15A, 15B, or 15C, the signal processor 464 calculates an angle θ, at which the finger 422 is bent, from a voltage having a level corresponding to varied resistance, varied capacitance, varied angular velocity or acceleration in a digital form. However, if the first sensor 480 is realized as shown in FIG. 16, the signal processor 464 counts the number of pulses of an electrical signal received from the light receiver 594 per unit time and calculates an angle θ, at which the finger 422 is bent, from the result of counting. If the first sensor 480 is realized as shown in FIG. 17, the signal processor 464 calculates an angle θ from a direction measured by the flux direction measurer 612.

In addition to the calculation of an angle θ, as described above, after step 440, the signal processor 464 can calculate necessary information, i.e., various types of displacement, from the result of sensing the motion of the hand and/or finger 422 in step 442. For this, the signal processor 464 calculates the degree of the upward or downward motion of the finger 422 as a first displacement from the result of sensing output from the second sensor 482, calculates the degree of the upward or downward motion of the hand as a second displacement from the result of sensing output from the third sensor 484, calculates the degree of the leftward or rightward motion of the hand as a third displacement from the result of sensing output from the fourth sensor 486, calculates the degree of the leftward or rightward motion of the finger 422 as a fourth displacement from the result of sensing output from the fifth sensor 488, and calculates the degree of the motion of the third knuckle 424 from the end of the finger 422 as a fifth displacement from the result of sensing output from the sixth sensor 490.

Here, when the ADC 462 is provided, the signal processor 464 calculates an angle and/or relevant displacement, from the result of sensing received from the ADC 462 in a digital form. However, when the ADC 462 is not provided, the signal processor 464 calculates an angle and/or relevant displacement from the result of sensing received from the sensing unit 4A. The interface unit 466, which is selectively provided between the signal processor 464 and the information selection unit 468 in FIG. 11, converts the angle and/or various types of displacement received from the signal processor 464 into a transmission form and wirely or wirelessly transmits the converted angle and/or various types of displacement to the information selection unit 468.

Meanwhile, when the sensing unit 4A is realized as the first sensor 480 only, after step 442, the information selection unit 468 determines a one-dimensional position on the information screen from the angle calculated by the signal processor 464, determines information at the one-dimensional position as information selected by a user, and outputs the information at the one-dimensional position through an output terminal OUT1 in step 444. The one-dimensional position may be a horizontal position or a vertical position within the information screen.

When the sensing unit 4A includes the second sensor 482 and/or the third sensor 484 in addition to the first sensor 480, after step 442, the information selection unit 468 determines a one-dimensional position in the information screen from the first displacement and/or second displacement and the angle, determines information at the one-dimensional position as information selected by a user, and outputs the information at the one-dimensional position through the output terminal OUT1 in step 444.

Hereinafter, a first embodiment 444A of step 444 and the configuration and operation of the information selection unit 468 performing step 444A will be described with reference to the attached drawings.

Figure 18:
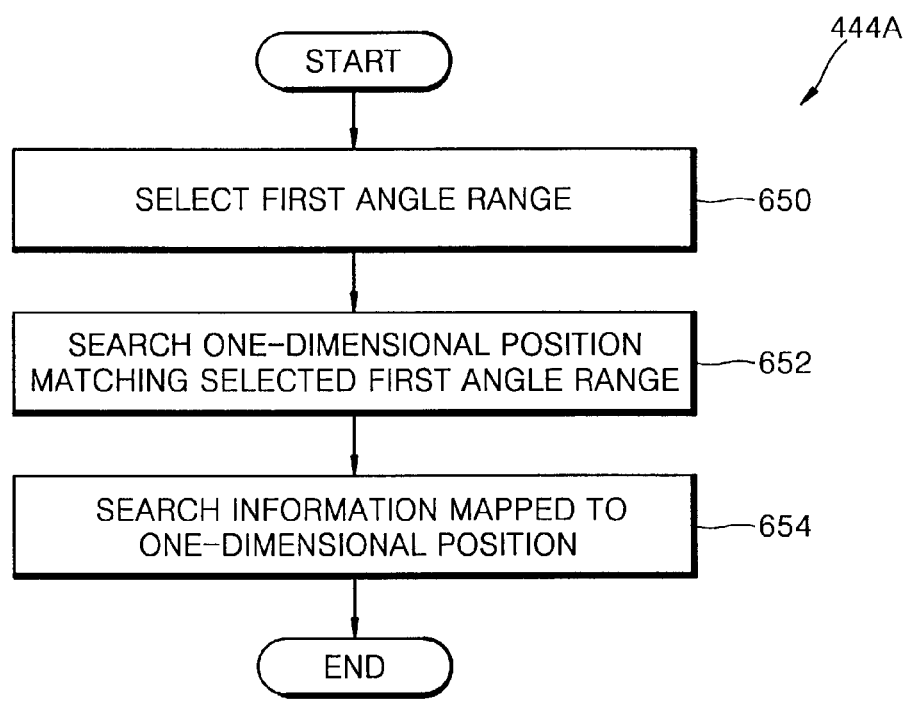
FIG. 18 is a flowchart of a first embodiment of step 444 shown in FIG. 10.

FIG. 18 is a flowchart of the first embodiment 444A of step 444 shown in FIG. 10. The step 444A includes finding information at a one-dimensional position found based on a relevant first angle range among first angle ranges in sub-steps 650 through 654.

Figure 19:
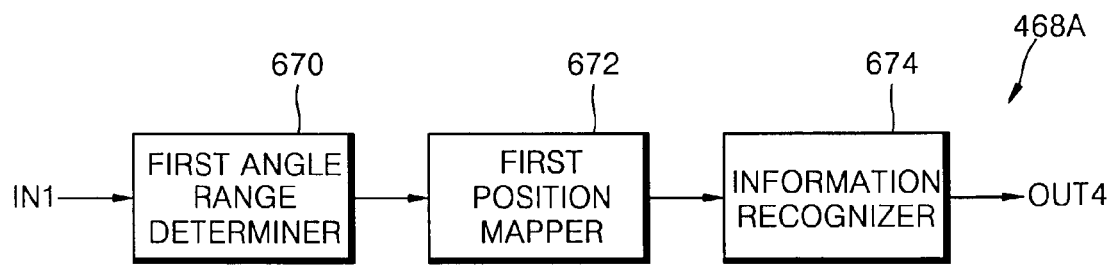
FIG. 19 is a block diagram of a first embodiment of an information selection unit shown in FIG. 11 for performing step 444A shown in FIG. 18.

FIG. 19 is a block diagram of a first embodiment 468A of the information selection unit 468 shown in FIG. 11 for performing step 444A shown in FIG. 18. The first embodiment 468A of the information selection unit 468 includes a first angle range determiner 670, a first position mapper 672, and an information recognizer 674.

After step 442, a relevant first angle range is selected from a first predetermined number of predetermined first angle ranges in step 650. The first predetermined number indicates the number of one-dimensional positions and denotes the number of pieces of information in a horizontal or vertical direction within the information screen.

In the case where the signal processor 464 calculates only the angle, in order to perform step 650, the first angle range determiner 670 compares the angle input from the signal processor 464 through an input terminal IN1 with a first predetermined number of the predetermined first angle ranges, selects a first angle range including the angle calculated by the signal processor 464 in response to the result of comparison, and outputs the selected first angle range to the first position mapper 672. For example, when it is assumed that the angle can be calculated in a range of 0°–90°, the first predetermined number is 3, and the predetermined first angle ranges are 0°–30° E, 30°–60°, and 60°–90°, the first angle range determiner 670 determines in which range the angle calculated by the signal processor 464 is included among the three first angle ranges in step 650.

In the case where the signal processor 464 calculates the angle and the first displacement and/or the second displacement, in order to perform step 650, the first angle range determiner 670 receives the angle and the first displacement and/or the second displacement from the signal processor 464 through the input terminal IN1 and selects a first angle range including the sum of the input angle and an angle corresponding to the first displacement and/or the second displacement.

After step 650, a one-dimensional position mapped to the selected first angle range is searched in step 652. The first position mapper 672 searches a one-dimensional position mapped to the first angle range input from the first angle range determiner 670 and outputs the searched one-dimensional position to the information recognizer 674.

After step 652, in step 654, information mapped to the searched one-dimensional position is searched, and the searched information is recognized as information selected by the user. The information recognizer 674 searches information mapped to the one-dimensional position input from the first position mapper 672, recognizes the searched information as information selected by the user, and outputs the recognized information through an output terminal OUT4. The information recognizer 674 may include a storage unit (not shown) for previously storing information at one-dimensional positions or the coordinate values of the information, and a reader (not shown) for reading out information or a coordinate value from the storage unit by using the one-dimensional position input from the first position mapper 672 as an address.

However, in the case where the sensing unit 4A includes the fourth sensor 486 and/or the fifth sensor 488 in addition to the first sensor 480, after step 442, the information selection unit 468 determines a two-dimensional position in the information screen from the third displacement and/or the fourth displacement and the angle, and determines information at the determined two-dimensional position as information selected by the user in step 444. Here, the two-dimensional position denotes a position in horizontal and vertical directions within the information screen. For example, when the information screen is the virtual keyboard 12, as shown in FIG. 1, a two-dimensional position is manifested as coordinates of column and row of a position of a key.

Hereinafter, a second embodiment 444B of step 444 and the configuration and operation of the information selection unit 468 performing step 444B will be described with reference to the attached drawings.

FIG. 20 is a flowchart of the second embodiment 444B of step 444 shown in FIG. 10. The second embodiment 444B of step 444 includes searching one-dimensional positions based on a relevant first angle range among first angle ranges and a relevant second angle range among second angle ranges in steps 690 and 692, and searching information using a two-dimensional position searched based on the one-dimensional positions in step 694.

FIG. 21 is a block diagram of a second embodiment 468B of the information selection unit 468 shown in FIG. 11 for performing step 444B shown in FIG. 20. The second embodiment 468B of the information selection unit 468 includes first and second angle range determiners 670 and 710, first and second position mappers 672 and 712, and an information recognizer 714.

After step 442, in step 690, a relevant first angle range is selected from a first predetermined number of first angle ranges, and a relevant second angle range is selected from a second predetermined number of predetermined second angle ranges. The second predetermined number indicates the number of one-dimensional positions to which the second angle ranges can be mapped. If the first predetermined number indicates the number of pieces of information in a horizontal direction within the information screen, the second predetermined number indicates the number of pieces of information in a vertical direction within the information screen. In contrast, if the first predetermined number indicates the number of pieces of information in the vertical direction within the information screen, the second predetermined number indicates the number of pieces of information in the horizontal direction within the information screen.

In step 690, the selecting of the relevant first angle range is the same as in step 650, so a description thereof will be omitted. In other words, the relevant first angle range is selected by the first angle range determiner 670 of FIG. 21 which is the same as that of FIG. 19. In order to select the relevant second angle range, the second angle range determiner 710 compares the second predetermined number of predetermined second angle ranges with the third displacement and/or the fourth displacement input from the signal processor 464 through an input terminal IN2, selects a second angle range including the third displacement and/or the fourth displacement in response to the result of comparison, and outputs the selected second angle range to the second position mapper 712. In other words, in the case where the signal processor 464 calculates a third displacement and/or a fourth displacement, the second angle range determiner 710 selects a relevant second angle range including the third displacement and/or the fourth displacement from the second predetermined number of predetermined second angle ranges.

After step 690, one-dimensional positions mapped to the selected first and second angle ranges, respectively, are searched in step 692. For clarity, it is assumed that the one-dimensional position mapped to the first angle range is a position in a horizontal direction within the information screen, and the one-dimensional position mapped to the second angle range is a position in a vertical direction within the information screen. To perform step 692, the first position mapper 672 searches a one-dimensional position mapped to the first angle range in the horizontal direction as in step 652, and the second position mapper 712 searches a one-dimensional position mapped to the second angle range, which is input from the second angle range determiner 710, in the vertical direction. The first and second position mappers 672 and 712 output the searched horizontal and vertical positions to the information recognizer 714. Each of the first and second position mappers 672 and 712 may include a storage unit (not shown) for previously storing horizontal or vertical positions corresponding to the first predetermined number of the first angle ranges or the second predetermined number of the second angle ranges and a reader (not shown) for reading out a horizontal or vertical one-dimensional position from the storage unit using the first or second angle range input from the first or second angle range determiner 670 or 710 as an address.

After step 692, in step 694, a two-dimensional position, that is, horizontal and vertical coordinates, is obtained from the two one-dimensional positions, for example, a horizontal position and a vertical position, information mapped to the two-dimensional position is searched, and the searched information is recognized as information selected by the user. The information recognizer 714 searches information mapped to horizontal and vertical coordinates of a two-dimensional position which is derived from the horizontal one-dimensional position input from the first position mapper 672 and the vertical one-dimensional position input from the second position mapper 712, recognizes the searched information as information selected by the user, and outputs the recognized information through an output terminal OUT5. Here, the information recognizer 714 may include a storage unit (not shown) for previously storing information positioned at two-dimensional positions, and a reader (not shown) for reading out information from the storage unit by using the two-dimensional position, which is obtained from the one-dimensional positions input from the first and second position mappers 672 and 712, as an address.

In the case where the sensing unit 4A includes the second through sixth sensor 482 through 490 in addition to the first sensor 480 in each of the right and left hands, the information selection unit 468 may simultaneously select a plurality of pieces of information.

An information input device and method for determining information selected by a user among many pieces of information displayed on an information screen have been described. The following description concerns the information input device and method for determining information, which is selected through such an arrangement described above, as information to be input.

Usually, a user accustomed to a keyboard or mouse clicks pointed information to determine the selected information as input information. When the user clicks, the third knuckle 424 of the finger 422 shown in FIG. 9 moves. Accordingly, in order to determine whether selected information is the input information that a user wants to input, the information input method and device shown in FIGS. 10 and 11 senses the motion of the third knuckle 424 using the sixth sensor 490. In other words, the information input device shown in FIG. 11 may be provided with the sixth sensor 490 in the sensing unit 4A in order to determine whether selected information is the input information that a user wants to input. Here, in order to check whether a user intends to determine the selected information as information to be input, that is, in order to check whether the motion of the third knuckle 424 corresponds to a clicking motion, the information selection unit 468 analyzes a fifth displacement calculated by the signal processor 464 and determines the selected information as input information in response to the result of analysis.

The second through sixth sensors 482, 484, 486, 488, and 490 may selectively be provided according to applications of an information input device and method. In other words, when the information input device and method are used for inputting key data information using an information screen in the form of a virtual keyboard, the sensing unit 4A can be provided with the first, fourth, and sixth sensors 480, 486, and 490 or the first, third, fourth, and sixth sensors 480, 484, 486, and 490.

For example, it is assumed that in order to select a desired key on an information screen realized as the virtual keyboard 12 in an information input method according to the present invention, as described above, a user is to select a key group, row, or key by moving his/her hand left, right, up, or down and click the selected key to determine key data corresponding to the selected key as input information. For this purpose, as shown in FIG. 11, the sensing unit 4A is provided with the fourth sensor 486 for sensing the leftward or rightward motion of the hand on the back or palm of the hand and the sixth sensor 490 for sensing a clicking motion on each finger.

Consequently, the sixth sensor 490 shown in FIG. 11 may function as each of sensors 40, 42, 44, and 46 shown in FIG. 1 to sense the click motion of the finger 422, and the third and fourth sensors 484 and 486 may function as a sensor 48 for sensing the upward, downward, leftward, and rightward motions of the hand. Here, only the fourth sensor 486 is provided for the sensor 48, and first or second sensor 480 or 482 may be provided instead of the third sensor 484 in the sensor 48. In this case, the upward or downward motion of the hand in an information input method according to the present invention is replaced by a bend or the upward or downward motion of the finger. The sensing unit 4A may be provided with the fifth sensor 488 at one or more of fingers 16, 18, 20, and 22 to sense the leftward or rightward motion of a finger.

As described above, unlike a conventional method of selecting a key on a virtual keyboard using a keyboard or a touch pad, an information input method according to the present invention allows a user to easily and quickly select a key on an information screen externally using a wearable information input device. It also allows the information screen composed of the selected keys to be minimized in a pattern suitable for the user's purpose, thereby minimizing areas overlapped by the information screen on the screen of a monitor.

What is claimed is:

1. An information input method using a wearable information input device which is worn on predetermined body parts of a user's body and has sensors for sensing motions of the predetermined body parts on a plane or in a space, the information input method comprising the steps of:
    (a) selecting a key group from a plurality of key groups, the selected key group including a desired key corresponding to information that the user desires to input by moving a first predetermined body part; and
    (b) selecting the desired key from the selected key group by moving a second predetermined body part,
    wherein the information corresponding to the selected key is determined as input information.

2. The information input method of claim 1, wherein the first predetermined body part is a hand, and the second predetermined body part is a finger.

3. The information input method of claim 2, wherein the sensor for sensing the motion of the hand and the sensor for sensing the motion of the finger are attached to the same hand.

4. The information input method of claim 2, wherein the sensor for sensing the motion of the hand and the sensor for sensing the motion of the finger are separately attached to different hands.

5. The information input method of claim 1, wherein the second predetermined body part is a thumb, an index finger, a middle finger, a ring finger, or a little finger.

6. The information input method of claim 1, wherein the information screen is displayed on a monitor attached to the user's body.

7. The information input method of claim 1, wherein the keys are for characters and functions.

8. The information input method of claim 1, wherein the keys are only for characters.

9. An information input method using a wearable information input device which is worn on predetermined body parts of a user's body and has sensors for sensing motions of the predetermined body parts on a plane or in a space, the information input method comprising the steps of:
    (a) selecting a key group including a desired key corresponding to information that the user desires to input by moving a first predetermined body part; and
    (b) selecting the desired key from the selected key group by moving a second predetermined body part,
    wherein the information corresponding to the selected key is determined as input information; and
    wherein the key group has a predetermined pattern and is included in at least one information screen embodied and virtually displayed using software, and the information screen has a plurality of key groups.

10. The information input method of claim 9, wherein the input information is displayed for the user.

11. The information input method of claim 9, wherein the information screen is a virtual keyboard embodied in software and displayed for the user.

12. The information input method of claim 11, further comprising the step of:
    (c) determining whether the key group including the desired key is a previously selected key group, going to step (a) when it is determined that the key group including the desired key is not the previously selected key group, and going to step (b) when it is determined that the key group including the desired key is the previously selected key group.

13. The information input method of claim 11, further comprising the steps of:

(d) determining whether the desired key exists on the displayed virtual keyboard, and going to step (a) when it is determined that the desired key exists on the displayed virtual keyboard; and (e) when it is determined that the desired key does not exist on the displayed virtual keyboard, displaying a virtual keyboard including the desired key among a plurality of virtual keyboards and going to step (a).

14. The information input method of claim 13, wherein step (e) comprises the sub-steps of:

(e1) determining whether keys included in the displayed virtual keyboard are the same type as the desired key when it is determined that the desired key does not exist on the displayed virtual keyboard;

(e2) when it is determined that the keys included in the displayed virtual keyboard are not the same type as the desired key, displaying a virtual keyboard having keys of the same type as the desired key;

(e3) determining whether the desired key exists on the virtual keyboard having keys of the same type as the desired key, and going to step (a) when it is determined that the desired key exists on the virtual keyboard having the keys of the same type as the desired key; and (e4) when it is determined that the desired key exists on the virtual keyboard having keys of the same type as the desired key in step (e3), or when it is determined that the keys included in the displayed virtual keyboard are the same type as the desired key in step (e1), displaying the virtual keyboard having the desired key and going to step (a).

15. The information input method of claim 14, wherein step (e2) comprises selecting a type conversion key among the keys on the displayed virtual keyboard by moving the second predetermined body part, thereby displaying the virtual keyboard having keys of the same type as the desired key.

16. The information input method of claim 14, wherein step (e2) comprises displaying the virtual keyboard having keys of the same type as the desired key by moving the second predetermined body part and a third predetermined body part.

17. The information input method of claim 16, wherein step (e4) comprises displaying the virtual keyboard having the desired key by moving the third predetermined body part.

18. The information input method of claim 16, wherein the third predetermined body part is a thumb, an index finger, a middle finger, a ring finger, or a little finger.

19. The information input method of claim 17, further comprising the steps of:

(f) when the desired key does not exist on the displayed virtual keyboard in step (d), determining whether there is the virtual keyboard including the desired key exists and going to step (e) when it is determined that there is the virtual keyboard including the desired key exists; and (g) when it is determined that there is no virtual keyboard including the desired key, generating key data corresponding to the input information, which the user desires to input by selecting the desired key, by moving the third predetermined body part.

20. The information input method of claim 19, wherein the third predetermined body part is moved a different number of times in steps (g), (e2), and (e4).

21. The information input method of claim 14, wherein step (e4) comprises displaying the virtual keyboard having the desired key by moving a third predetermined body part.

22. The information input method of claim 21, wherein the third predetermined body part is a thumb, an index finger, a middle finger, a ring finger, or a little finger.

23. The information input method of claim 14, wherein step (e4) comprises selecting a keyboard conversion key among the keys on the displayed virtual keyboard by moving the second predetermined body part, thereby displaying the virtual keyboard having the desired key.

24. The information input method of claim 13, further comprising the steps of:

(f) when the desired key does not exist on the displayed virtual keyboard in step (d), determining whether there is the virtual keyboard including the desired key exists and going to step (e) when it is determined that there is the virtual keyboard including the desired key exists; and (g) when it is determined that there is no virtual keyboard including the desired key, generating key data corresponding to the input information, which the user desires to input by selecting the desired key, by moving a third predetermined body part.

25. The information input method of claim 24, wherein step (g) comprises generating at least two key data, which do not exist on the virtual keyboard, by moving the third predetermined body part a different number of times.

26. The information input method of claim 11, wherein at least one key on the virtual keyboard has at least two key data, step (b) comprises consecutively selecting the at least two key data corresponding to the desired key by consecutively moving the second predetermined body part, and the selected key data is the input information.

27. The information input method of claim 26, wherein step (b) comprises consecutively selecting the at least two key data corresponding to one key by moving a third predetermined body part.

28. The information input method of claim 27, wherein step (b) comprises the sub-steps of:

(b1) determining whether key data currently desired to be selected is displayed on a previously selected key after step (a);

(b2) when it is determined that the currently desired key data is displayed on the previously selected key, moving the third predetermined body part; and (b3) when it is determined that the currently desired key data is not displayed on the previously selected key, or after step (b2), selecting the desired key data by moving the second predetermined body part.

* * * * *